US010644381B2

(12) United States Patent
Ye et al.

(10) Patent No.: US 10,644,381 B2
(45) Date of Patent: May 5, 2020

(54) ANTENNA STRUCTURE AND WIRELESS COMMUNICATION DEVICE USING SAME

(71) Applicant: Chiun Mai Communication Systems, Inc., New Taipei (TW)

(72) Inventors: Wei-Xuan Ye, New Taipei (TW); Wen-Chang Hsu, New Taipei (TW); Te-Chang Lin, New Taipei (TW)

(73) Assignee: Chiun Mai Communication Systems, Inc., New Taipei (TW)

( * ) Notice: Subject to any disclaimer, the term of this patent is extended or adjusted under 35 U.S.C. 154(b) by 28 days.

(21) Appl. No.: 16/006,815

(22) Filed: Jun. 12, 2018

(65) Prior Publication Data

US 2019/0044218 A1 Feb. 7, 2019

(30) Foreign Application Priority Data

Aug. 5, 2017 (CN) .......................... 2017 1 0663431

(51) Int. Cl.
*H01Q 1/24* (2006.01)
*H04W 88/06* (2009.01)
*H01Q 5/35* (2015.01)
*H01Q 5/385* (2015.01)
*H01Q 5/50* (2015.01)
*H01Q 1/22* (2006.01)

(52) U.S. Cl.
CPC ............... *H01Q 1/243* (2013.01); *H01Q 5/35* (2015.01); *H01Q 5/385* (2015.01); *H01Q 5/50* (2015.01); *H04W 88/06* (2013.01); *H01Q 1/2291* (2013.01)

(58) Field of Classification Search
CPC ............ H01Q 1/243; H01Q 5/50; H01Q 5/35; H01Q 5/385; H04W 88/06
See application file for complete search history.

(56) References Cited

U.S. PATENT DOCUMENTS

2018/0026360 A1\* 1/2018 Lee ........................ H01Q 1/243
343/872
2018/0026370 A1 1/2018 Lee et al.

FOREIGN PATENT DOCUMENTS

CN 205960191 2/2017
TW 201401644 A 1/2014

\* cited by examiner

*Primary Examiner* — Sam Bhattacharya
(74) *Attorney, Agent, or Firm* — ScienBiziP, P.C.

(57) ABSTRACT

An antenna structure includes a housing, a first feed source, a first radiator, a second radiator, and a second feed source. The housing includes a first radiating portion. The first feed source feeds current to the first radiating portion and the first radiating portion activates a first mode to generate radiation signals in a first frequency band. The first radiator is positioned in the housing. The first radiating portion further couples the current to the first radiator and the first radiator activates a second mode to generate radiation signals in a second frequency band. The second radiator is positioned in a space formed by the first radiator. The second feed source feeds current to the second radiator and the second radiator activates a third mode to generate radiation signals in a third frequency band.

30 Claims, 26 Drawing Sheets

ANTENNA STRUCTURE AND WIRELESS COMMUNICATION DEVICE USING SAME

FIELD

The subject matter herein generally relates to an antenna structure and a wireless communication device using the antenna structure.

BACKGROUND

Antennas are important components in wireless communication devices for receiving and transmitting wireless signals at different frequencies, such as signals in Long Term Evolution Advanced (LTE-A) frequency bands. However, the antenna structure is complicated and occupies a large space in the wireless communication device, which is inconvenient for miniaturization of the wireless communication device.

BRIEF DESCRIPTION OF THE DRAWINGS

Implementations of the present disclosure will now be described, by way of example only, with reference to the attached figures.

DETAILED DESCRIPTION

Figure 1:
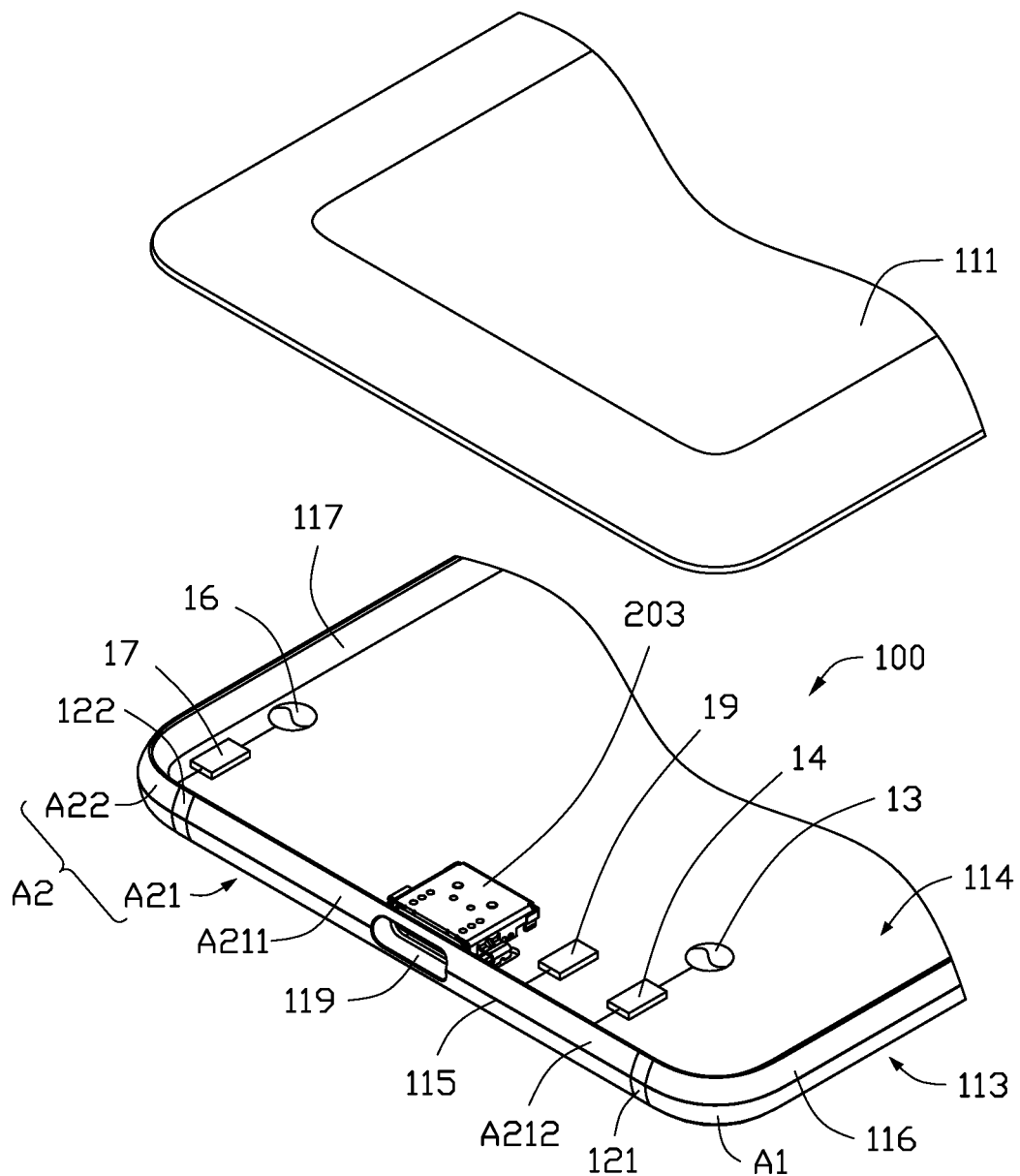
FIG. 1 is an isometric view of a first exemplary embodiment of a wireless communication device using a first exemplary antenna structure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an antenna structure and a wireless communication device using same.

Exemplary Embodiment 1

FIG. 1 illustrates an exemplary embodiment of a wireless communication device 200 using a first exemplary antenna structure 100. The wireless communication device 200 can be a mobile phone or a personal digital assistant, for example. The antenna structure 100 can receive and transmit wireless signals.

Figure 2:
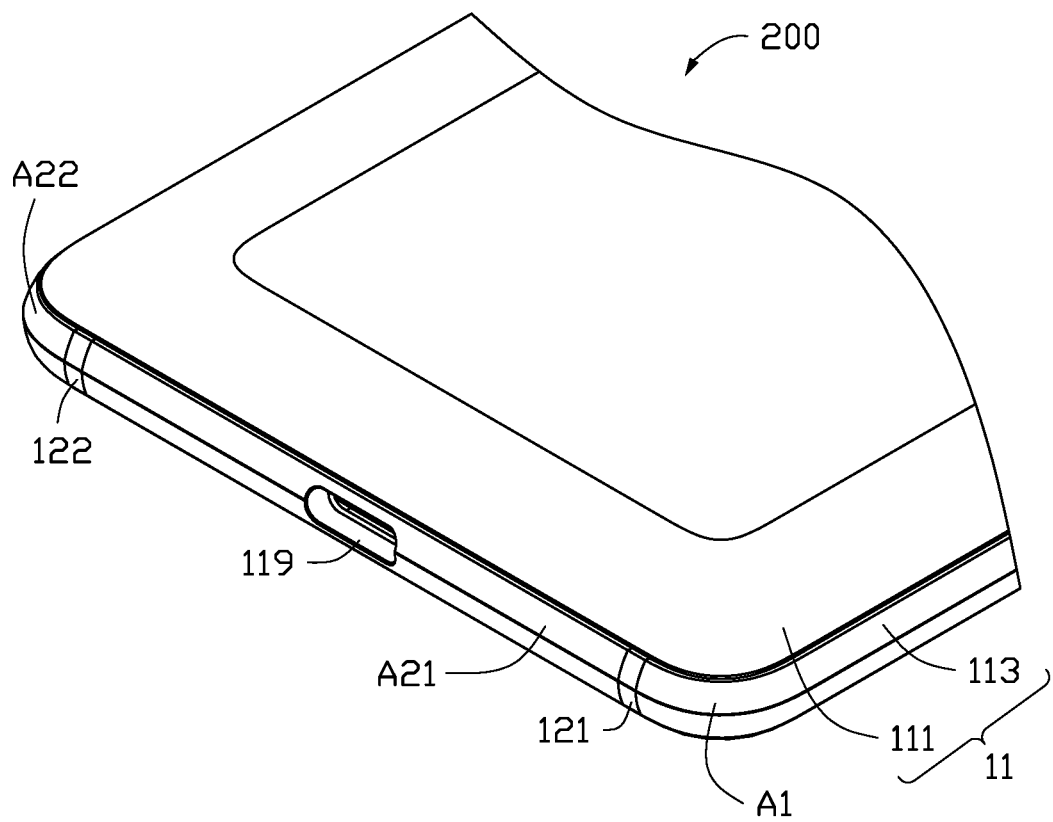
FIG. 2 is an assembled, isometric view of the wireless communication device of FIG. 1.
Figure 3:
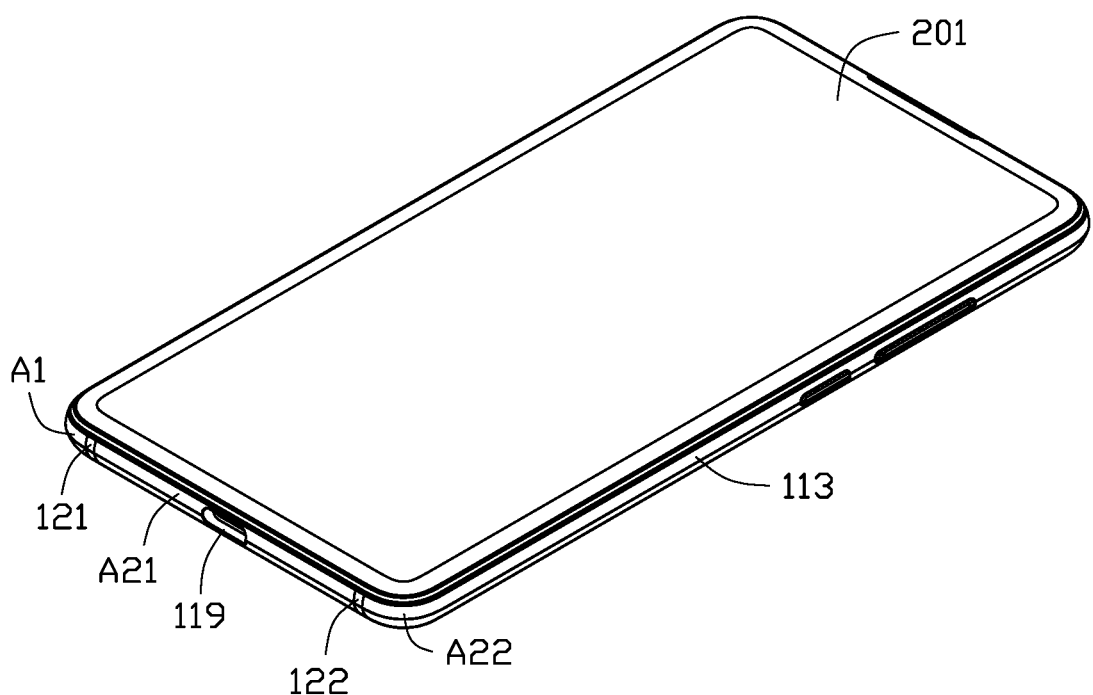
FIG. 3 is similar to FIG. 2, but shown from another angle.

As illustrated in FIG. 2 and FIG. 3, the antenna structure 100 includes a housing 11 (shown in FIG. 2), a first signal source 13, a first impedance circuit 14, a second signal source 16, and a second impedance circuit 17.

The housing 11 houses the wireless communication device 200. In this exemplary embodiment, the housing 11 includes a backboard 111 and a side frame 113. In this exemplary embodiment, the backboard 111 is made of non-metallic material, for example, plastic or glass. The side frame 113 is made of metallic material. The backboard 111 and the side frame 113 cooperatively form the housing of the wireless communication device 200.

The side frame 113 is substantially annular. The side frame 113 defines an opening (not labeled). The wireless communication device 200 includes a display 201 (shown in FIG. 3). The display 201 is received in the opening. The display 201 has a display surface. The display surface is exposed at the opening and is positioned parallel to the backboard 111. In this exemplary embodiment, the side frame 113 is positioned around a periphery of the backboard 111. The side frame 113 forms a receiving space 114 together with the display 201 and the backboard 111. The receiving space 114 can receive a printed circuit board, a processing unit, or other electronic components or modules.

In this exemplary embodiment, the side frame 113 includes an end portion 115, a first side portion 116, and a second side portion 117. In this exemplary embodiment, the end portion 115 is a bottom portion of the wireless communication device 200. The first side portion 116 is spaced apart from and parallel to the second side portion 117. The end portion 115 has first and second ends. The first side portion 116 is connected to the first end of the end portion 115 and the second side portion 117 is connected to the second end of the end portion 115. In this exemplary embodiment, the end portion 115, the first side portion 116, and the second side portion 117 are all perpendicularly connected to the backboard 111.

The side frame 113 further defines a through hole 119, a gap 121, and a groove 122. The through hole 119 is defined at a middle position of the end portion 115 and passes through the end portion 115. The wireless communication device 200 further includes an electronic element 203. In this exemplary embodiment, the electronic element 203 is a Universal Serial Bus (USB) module. The electronic element 203 is received in the receiving space 114 and corresponds to the through hole 119. Then, the electronic element 203 is partially exposed from the through hole 119. A USB device can be inserted in the through hole 119 and be electrically connected to the electronic element 203.

In this exemplary embodiment, the gap 121 is defined at the side frame 113 between the through hole 119 and the first side portion 116. The gap 121 passes through and extends to cut across the side frame 113. The side frame 113 is divided into two portions by the gap 121. The two portions are a coupling portion A1 and a radiating portion A2. A first portion of the side frame 113 extending from a first side of the gap 121 adjacent to the first side portion 116 forms the coupling portion A1. A second portion of the side frame 113 extending from a second side of the gap 121 forms the radiating portion A2. In this exemplary embodiment, the gap 121 is not positioned at a middle portion of the end portion 115. The radiating portion A2 is longer than the coupling portion A1.

In this exemplary embodiment, the groove 122 is defined at the side frame 113 between the through hole 119 and the second side portion 117. The gap 121 and the groove 122 are defined at two sides of the through hole 119. The groove 122 passes through and extends to cut across the side frame 113. The radiating portion A2 is divided into two portions by the groove 122. The two portions are a first radiating section A21 and a second radiating section A22. A first portion of the side frame 113 between the gap 121 and the groove 122 forms the first radiating section A21. A second portion of the side frame 113 extending from the groove 122 and away from the gap 121 and adjacent to the second side portion 117 forms the second radiating section A22.

In this exemplary embodiment, the groove 122 is not positioned at a middle portion of the radiating portion A2. The first radiating section A21 is longer than the second radiating section A22.

In this exemplary embodiment, the gap 121 and the groove 122 are both filled with insulating material, for example, plastic, rubber, glass, wood, ceramic, or the like, thereby isolating the coupling portion A1, the first radiating section A21 and the second radiating section A22 of the radiating portion A2.

Figure 4:
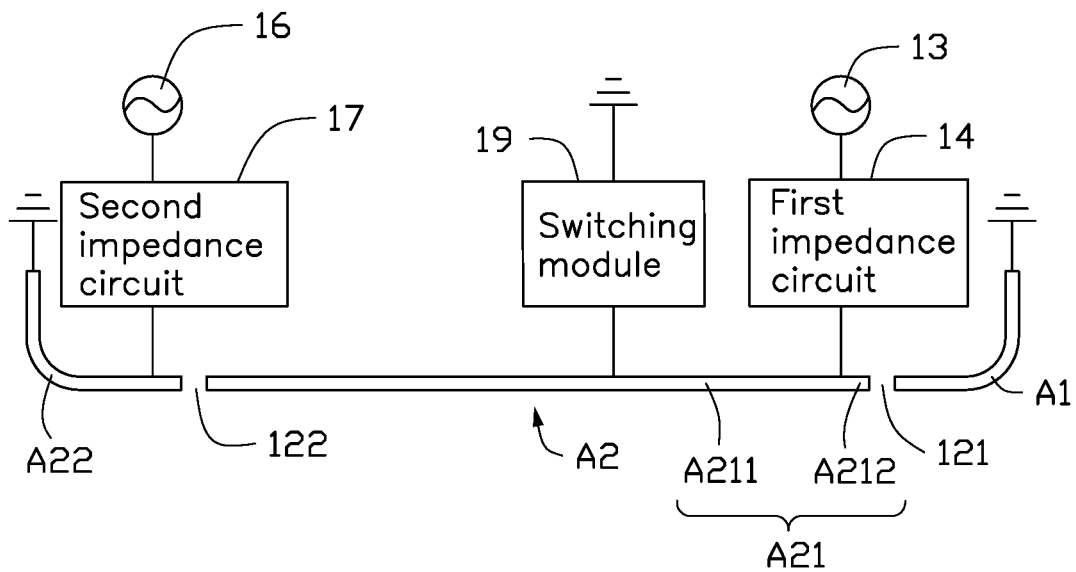
FIG. 4 is a circuit diagram of the antenna structure of FIG. 1.

FIG. 4 illustrates the first signal source 13 is positioned in the receiving space 114 between the first side portion 116 and the electronic element 203. One end of the first signal source 13 is electrically connected to the first radiating section A21 through the first impedance circuit 14. The first signal source 13 divides the first radiating section A21 into two portions, that is, a first branch A211 and a second branch A212. A first portion of the side frame 113 between the first signal source 13 and the groove 122 forms the first branch A211. A second portion of the side frame 113 between the first signal source 13 and the gap 121 forms the second branch A212.

In this exemplary embodiment, a location of the first signal source 13 does not correspond to a middle portion of the first radiating section A21. The first branch A211 is longer than the second branch A212.

The second signal source 16 is positioned in the receiving space 114. One end of the second signal source 16 is electrically connected to the second radiating section A22 through the second impedance circuit 17 for feeding current to the second radiating section A22.

In this exemplary embodiment, the coupling portion A1 and the second radiating section A22 of the radiating portion A2 are both grounded. The first signal source 13 and the first branch A211 of the first radiating section A21 cooperatively form a first antenna. The first signal source 13, the second branch A212 of the first radiating section A21, and the coupling portion A2 cooperatively form a second antenna. The second signal source 16 and the second radiating section A22 of the radiating portion A2 cooperatively form a third antenna.

In this exemplary embodiment, the first antenna is a monopole antenna and activates a first operation mode to generate radiation signals in a first radiation frequency band. The second antenna is a coupling-feed antenna and activates a second operation mode to generate radiation signals in a second radiation frequency band. The third antenna is a loop antenna and activates a third operation mode to generate radiation signals in a third radiation frequency band.

In this exemplary embodiment, a frequency of the third radiation frequency band is higher than a frequency of the second radiation frequency band. A frequency of the second radiation frequency band is higher than a frequency of the first radiation frequency band. The first operation mode is a LTE-A low frequency operation mode. The first radiation frequency band is about LTE-A 700-960 MHz. The second operation mode is a LTE-A middle frequency operation mode. The second radiation frequency band is about LTE-A 1710-2170 MHz. The third operation mode is a LTE-A high frequency operation mode. The third radiation frequency band is about LTE-A 2300-2690 MHz.

Figure 5:
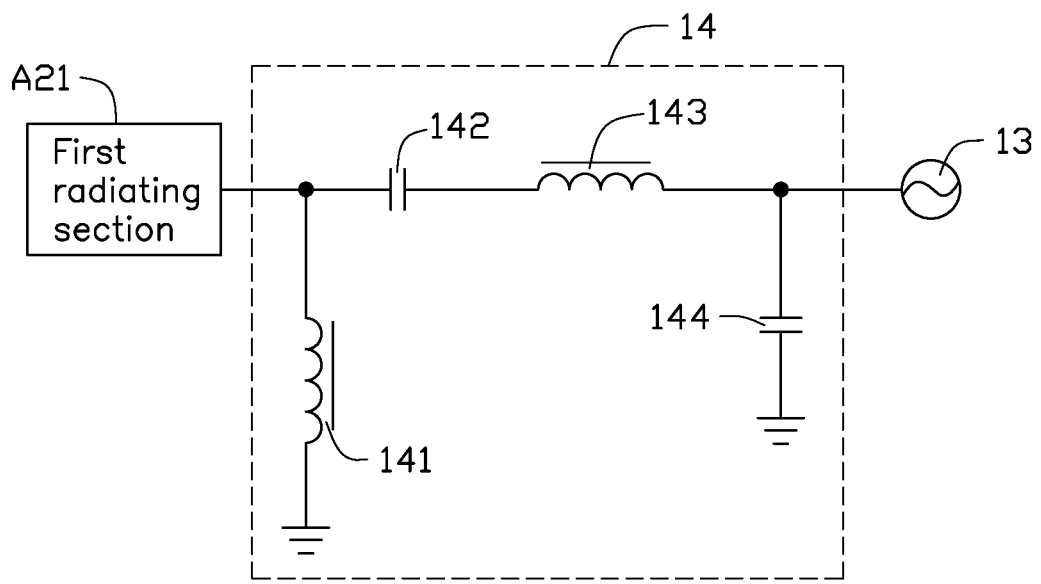
FIG. 5 is a circuit diagram of a first matching circuit of the antenna structure of FIG. 4.

As illustrated in FIG. 5, in this exemplary embodiment, the first impedance circuit 14 includes a first impedance element 141, a second impedance element 142, a third impedance element 143, and a fourth impedance element 144. One end of the first impedance element 141 is electrically connected to the first radiating section A21 and one end of the second impedance element 142. Another end of the first impedance element 141 is grounded. Another end of the second impedance element 142 and the third impedance element 143 are connected in series and is electrically connected to the first signal source 13. One end of the fourth impedance element 144 is electrically connected between the third impedance element 143 and the first signal source 13. Another end of the fourth impedance element 144 is grounded.

In this exemplary embodiment, the first impedance element 141 and the second impedance element 142 are used for impedance matching the first radiation frequency band of the first antenna. The third impedance element 143 and the fourth impedance element 144 are used for impedance matching the second radiation frequency band of the second antenna. The first impedance element 141 and the third impedance element 143 are both inductors. The second impedance element 142 and the fourth impedance element 144 are both capacitors. Inductance values of the first impedance element 141 and the third impedance element 143 are 3 nH and 1 nH, respectively. Capacitance values of the second impedance element 142 and the fourth impedance element 144 are 3.3 pF and 1 pF, respectively.

In other exemplary embodiments, the first impedance element 141, the second impedance element 142, the third impedance element 143, and the fourth impedance element 144 are not limited to be inductors and capacitors, and can be other impedance elements or a combination.

Figure 6:
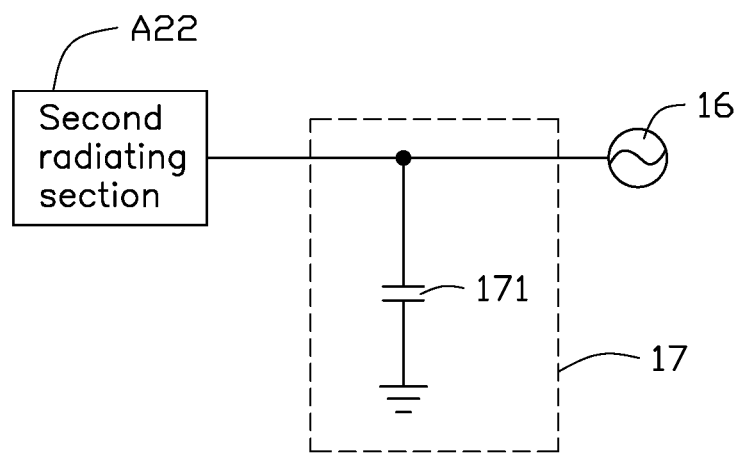
FIG. 6 is a circuit diagram of a second matching circuit of the antenna structure of FIG. 5.

As illustrated in FIG. 6, the second impedance circuit 17 includes an impedance element 171. One end of the impedance element 171 is electrically connected between the second radiating section A22 and the second signal source 16. Another end of the impedance element 171 is grounded. The impedance element 171 is used for impedance matching the third radiation frequency band of the third antenna. In this exemplary embodiment, the impedance element 171 is a capacitor and a capacitance value of the impedance element 171 is 1 pF. In other exemplary embodiments, the impedance element 171 is not limited to be a capacitor, and can be an inductor, other impedance elements or a combination.

Figure 7:
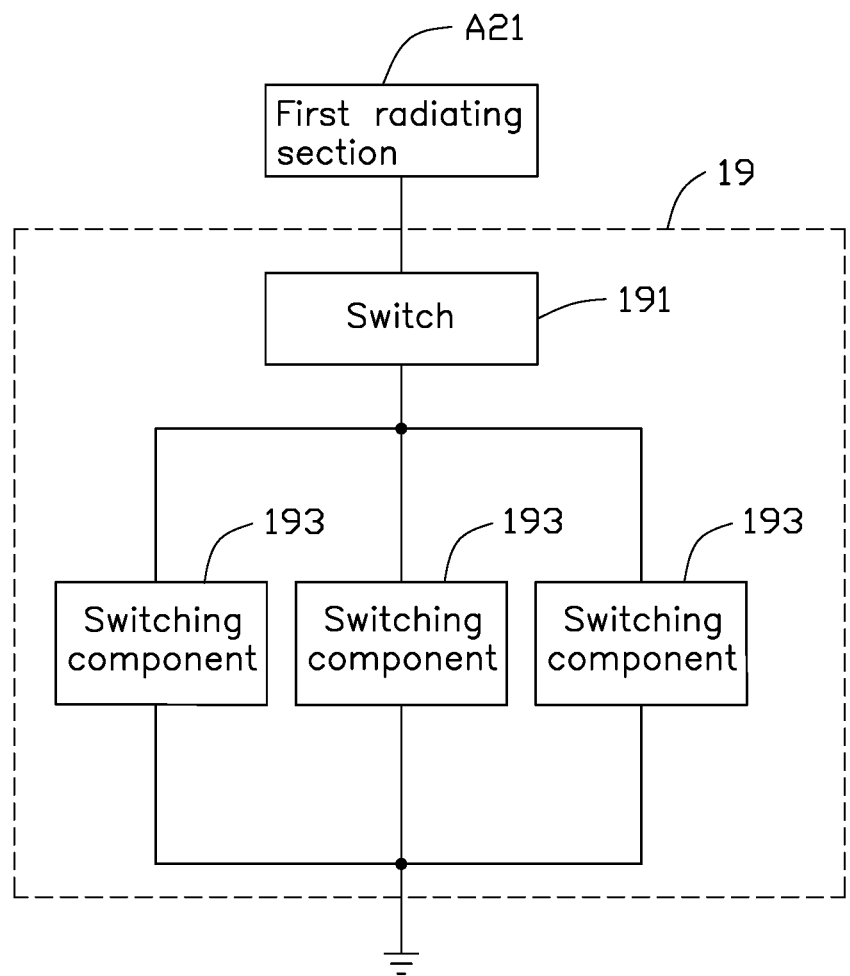
FIG. 7 is a circuit diagram of a switching circuit of the antenna structure of FIG. 5.

As illustrated in FIG. 4 and FIG. 7, in this exemplary embodiment, the antenna structure 100 further includes a switching module 19. One end of the switching module 19 is electrically connected to a location of the first radiating section A21 adjacent to the gap 121. Another end of the switching module 19 is grounded. The switching module 19 includes a switch 191 and a plurality of switching components 193. The switch 191 is electrically connected to the first radiating section A21. The switching components 193 can be an inductor, a capacitor, or a combination of the inductor and the capacitor. The switching components 193 are connected in parallel to each other. One end of each switching component 193 is electrically connected to the switch 191. The other end of each switching component 193 is grounded.

Through control of the switch 191, the first radiating section A21 can be switched to connect with different switching components 193. Since each switching component 193 has a different impedance, an operating frequency band of the first operation mode can be adjusted.

For example, in this exemplary embodiment, the switching module 19 includes three switching components 193. The three switching components 193 are at an open-circuit state, an inductor having an inductance value of about 18 nH, and at a short-circuit state, respectively. When the switch 191 is switched to connect with the switching component 193 being at the open-circuit state, the first antenna can work at a frequency band of about 704-803 MHz. When the switch 191 is switched to connect with the switching component 193 being at the short-circuit state, the first antenna can form an inverted-F antenna and work at a frequency band of about 880-960 MHz. When the switch 191 is switched to connect with the switching component 193 having an inductance value of about 18 nH, the first antenna and the switching component 193 are connected in parallel, then a phase of the first antenna can be changed and the first antenna can work at a frequency band of about 824-894 MHz.

Figure 8:
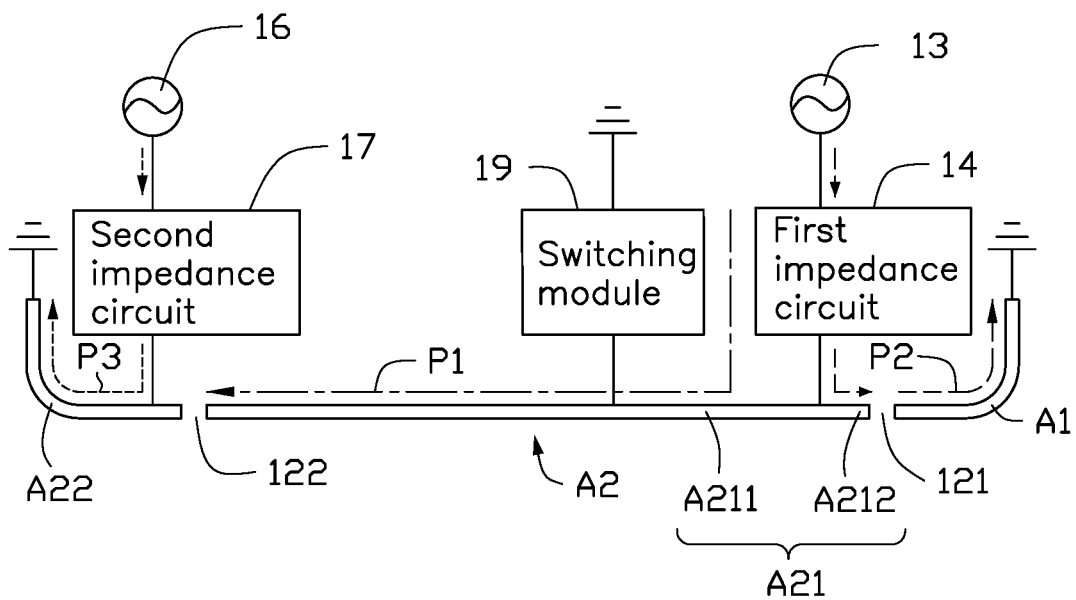
FIG. 8 is a current path distribution graph of the antenna structure of FIG. 4.

As illustrated in FIG. 8, when the first signal source 13 supplies current, a first portion of the current flows through the first branch A211 and flows towards the groove 122 (Per path P1) to activate the first operation mode to generate radiation signals in the first radiation frequency band. When the first signal source 13 supplies current, a second portion of the current flows through the second branch A212 and is coupled to the coupling portion A1 through the gap 121 (Per path P2) to activate the second operation mode to generate radiation signals in the second radiation frequency band. When the second signal source 16 supplies current, the current flows through the second radiating section A22 (Per path P3) to activate the third operation mode to generate radiation signals in the third radiation frequency band.

Figure 9:
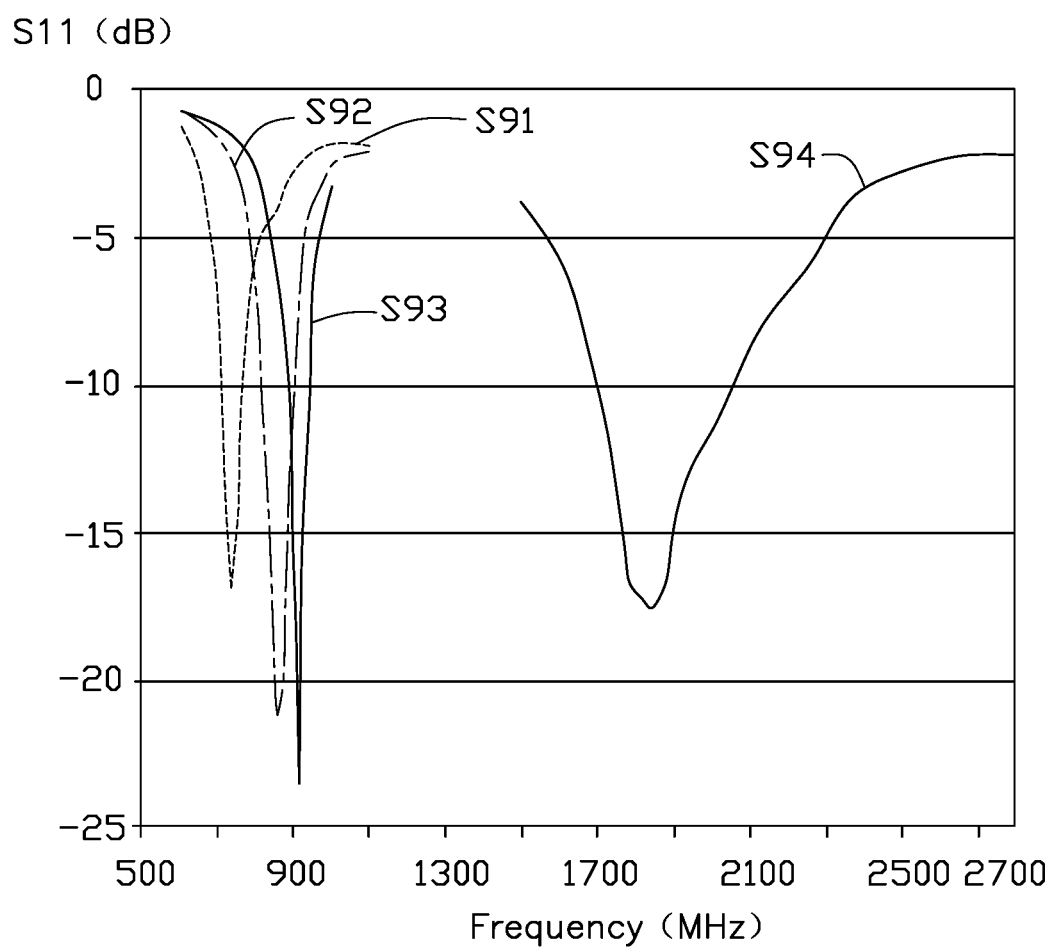
FIG. 9 is a scattering parameter graph when the antenna structure of FIG. 1 works at LTE-A low and middle frequency operation modes.

FIG. 9 illustrates a scattering parameter graph when the antenna structure 100 works at LTE-A low and middle frequency operation modes. Curve 91 illustrates a scattering parameter when the antenna structure 100 works at a frequency band of 703-803 MHz (LTE-A Band 28). Curve 92 illustrates a scattering parameter when the antenna structure 100 works at a frequency band of 824-894 MHz (LTE-A Band 5). Curve 93 illustrates a scattering parameter when the antenna structure 100 works at a frequency band of 880-960 MHz (LTE-A Band 8). Curve 94 illustrates a scattering parameter when the antenna structure 100 works at a frequency band of about LTE-A 1710-2170 MHz.

The curves S91-S93 respectively correspond to three different frequency bands, and respectively correspond to three of multiple low frequency operation modes that the switching module 19 can be switched. In addition, since the antenna structure 100 includes the switching module 19, through switching of the switching module 19 to switch the first radiation frequency band, without affecting operations of the middle and high frequency bands.

Figure 10:
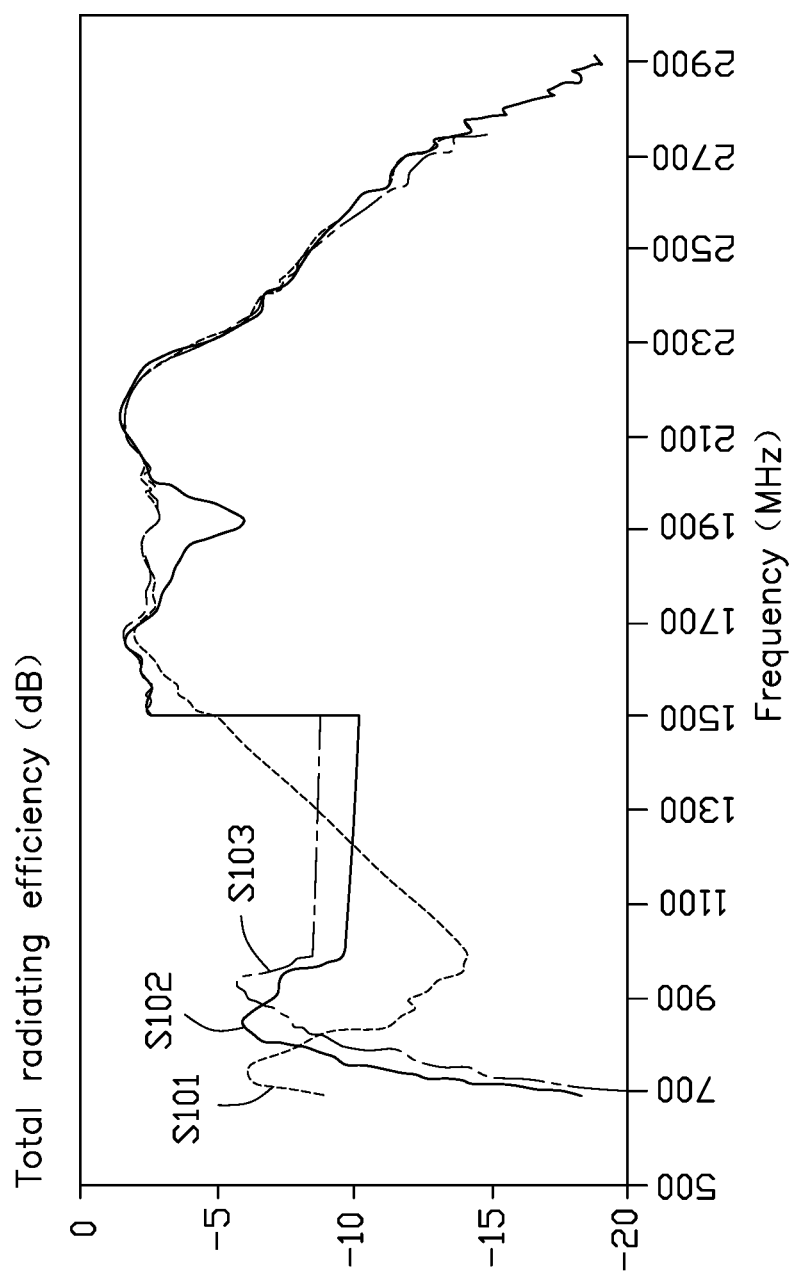
FIG. 10 is a total radiating efficiency graph when the antenna structure of FIG. 1 works at the LTE-A low and middle frequency operation modes.

FIG. 10 illustrates a total radiating efficiency graph when the antenna structure 100 works at the LTE-A low and middle frequency operation modes. Curve 101 illustrates a total radiating efficiency when the antenna structure 100 works at a frequency band of 703-803 MHz (LTE-A Band 28) and the middle frequency operation mode. Curve 102 illustrates a total radiating efficiency when the antenna structure 100 works at a frequency band of 824-894 MHz (LTE-A Band 5) and the middle frequency operation mode. Curve 103 illustrates a total radiating efficiency when the antenna structure 100 works at a frequency band of 880-960 MHz (LTE-A Band 8) and the middle frequency operation mode. The antenna structure 100 has a good efficiency at the low frequency band and the middle frequency band. An efficiency of the low frequency band is about 25% and an efficiency of the middle frequency band is greater than 50%.

Figure 11:
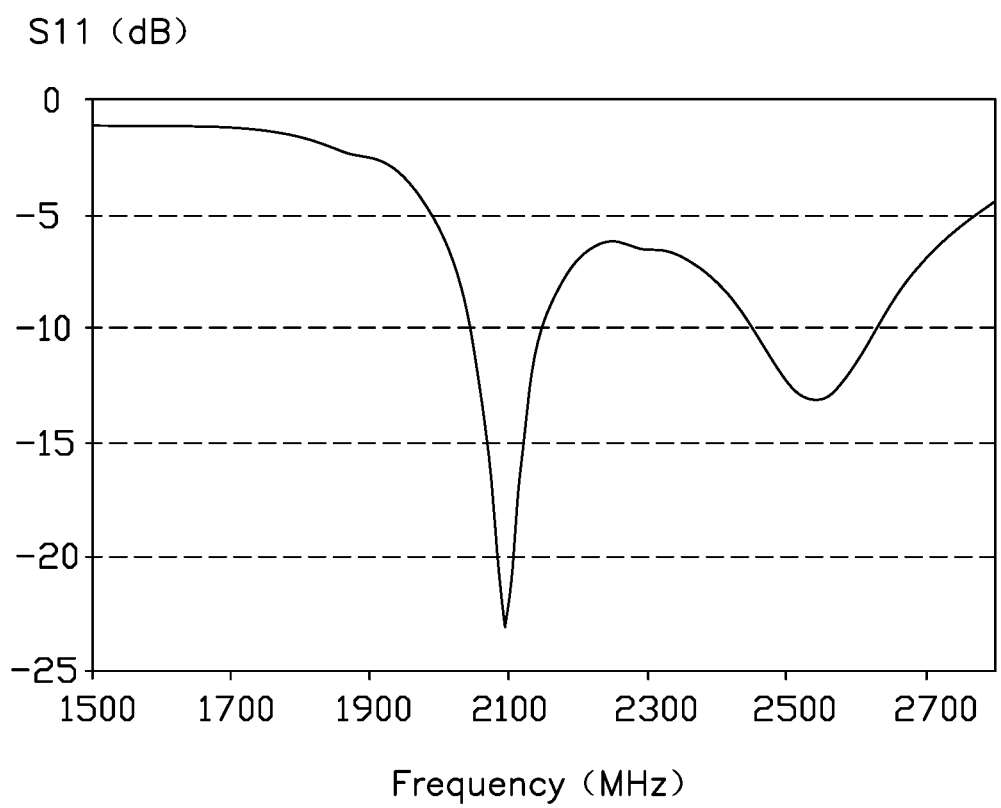
FIG. 11 is a scattering parameter graph when the antenna structure of FIG. 1 works at a LTE-A high frequency operation mode.
Figure 12:
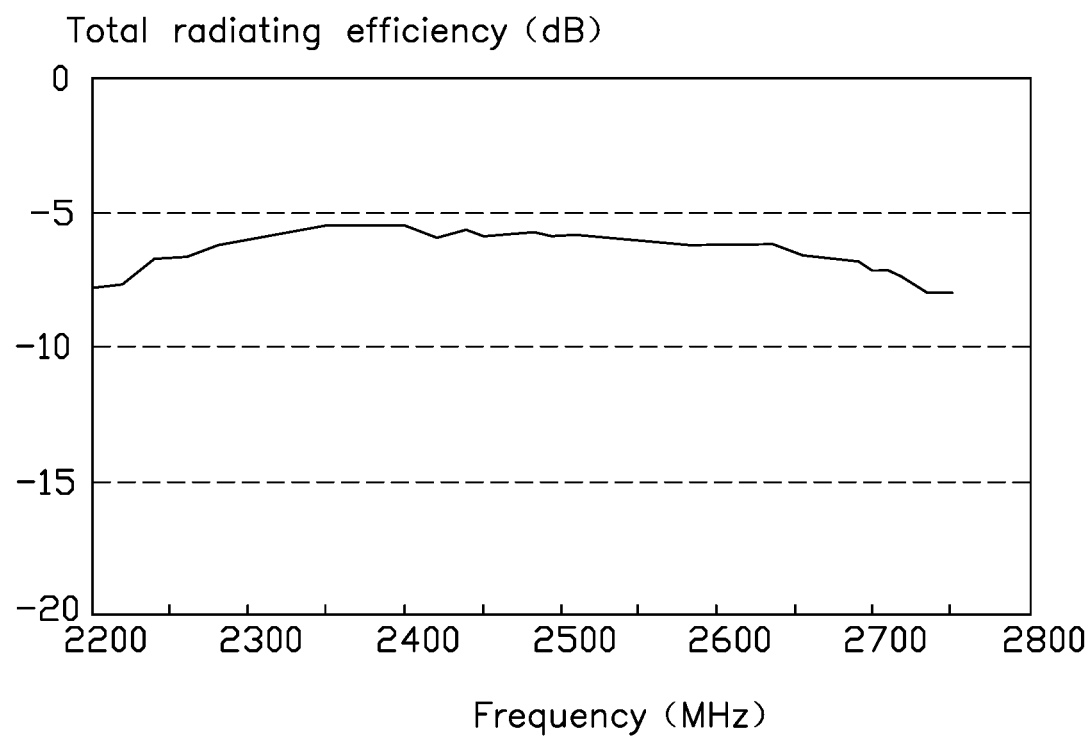
FIG. 12 is a total radiating efficiency graph when the antenna structure of FIG. 1 works at the LTE-A high frequency operation mode.

FIG. 11 illustrates a scattering parameter graph when the antenna structure 100 works at LTE-A high frequency operation mode. FIG. 12 illustrates a total radiating efficiency graph when the antenna structure 100 works at the LTE-A high frequency operation mode. A radiating efficiency of the antenna structure 100 at the high frequency band is about 25% and a frequency bandwidth of the high frequency band can cover a frequency band of TDD LTE B40 (2300-2400 MHz) and a frequency band of TDD LTE B41 (2496-2690 MHz).

As illustrated in FIG. 9 to FIG. 12, the antenna structure 100 may work at a corresponding low frequency band, for example, a frequency band of LTE-A 704-960 MHz. The antenna structure 100 may also work at a middle frequency band (a frequency band of LTE-A 1710-2170 MHz) and a high frequency band (a frequency band of LTE-A 2300-2690 MHz). That is, the antenna structure 100 may completely cover the LTE-A low, middle, and high frequency bands. When the antenna structure 100 works at these frequency bands, the antenna structure 100 has a good radiating efficiency, which satisfies antenna design requirements.

As described above, the antenna structure 100 defines the gap 121 and the groove 122, then the side frame 113 is divided into a coupling portion A1, a first radiating section A21 and a second radiating section A22 of the radiating portion A2. The antenna structure 100 further includes the first signal source 13 and the second signal source 16, the current from the first signal source 13 flows through the first radiating section A21 and is further coupled to the coupling portion A1. The current from the second signal source 16 flows through the second radiating section A22. Then the first radiating section A21 activates the first operation mode to generate radiation signals in the low frequency band. The coupling portion A1 activates the second operation mode to generate radiation signals in the middle frequency band. The second radiating section A22 activates the third operation mode to generate radiation signals in the high frequency band. The wireless communication device 200 can use carrier aggregation (CA) technology of LTE-A to receive or send wireless signals at multiple frequency bands simultaneously.

In addition, the antenna structure 100 includes the housing 11. The gap 121 and the groove 122 are both defined on the side frame 113 instead of the backboard 111. Then the antenna structure 100 can only use the side frame 113 to activate corresponding low, middle, and high frequency bands. Then the backboard 111 can be entirely made of non-metallic material, which is complete and beautiful, and can effectively adapt to a trend of a miniaturization of antenna clearance areas, and can also effectively ensure a stability of wireless signal reception.

Exemplary Embodiment 2

Figure 13:
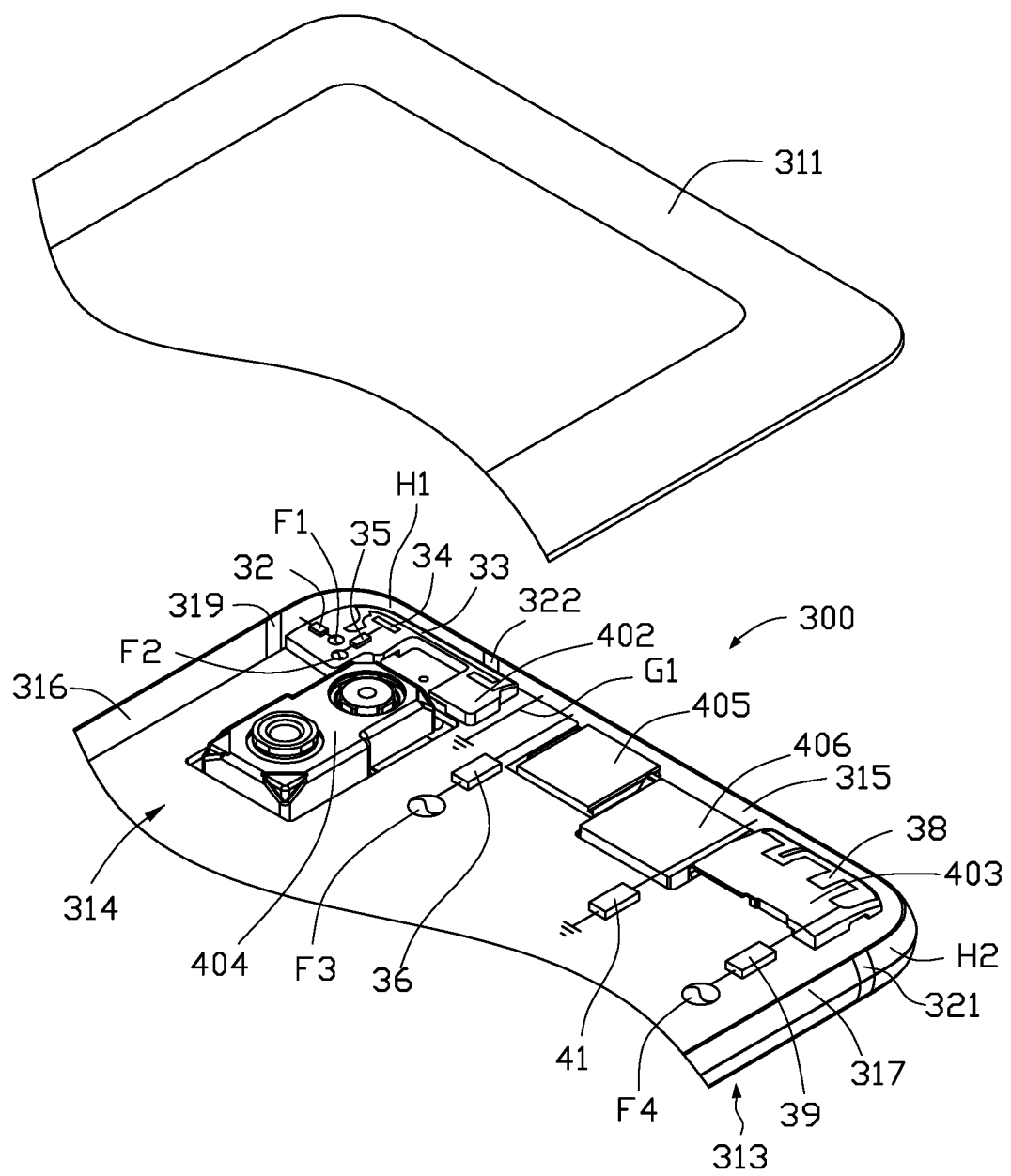
FIG. 13 is an isometric view of a second exemplary embodiment of a wireless communication device using a second exemplary antenna structure.

FIG. 13 illustrates an exemplary embodiment of a wireless communication device 400 using a second exemplary antenna structure 300. The wireless communication device 400 can be a mobile phone or a personal digital assistant, for example. The antenna structure 300 can receive and transmit wireless signals.

Figure 14:
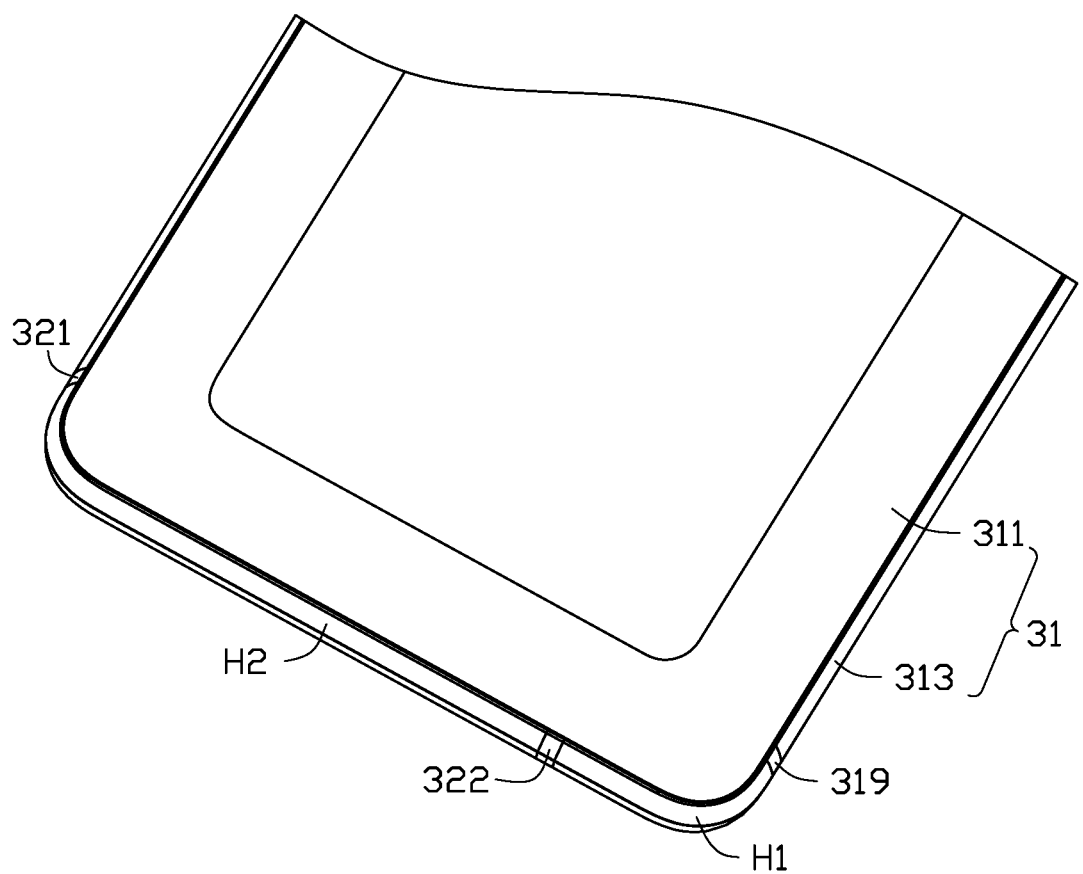
FIG. 14 is an assembled, isometric view of the wireless communication device of FIG. 13.
Figure 15:
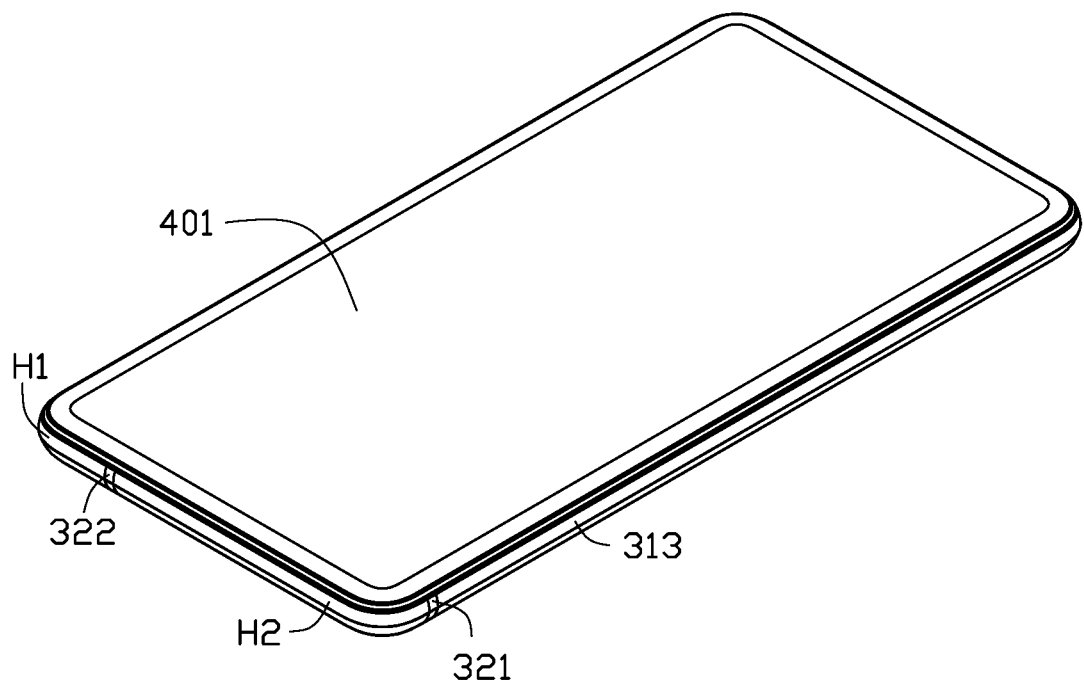
FIG. 15 is similar to FIG. 14, but shown from another angle.

As illustrated in FIG. 14 and FIG. 15, the antenna structure 300 includes a housing 31 (shown in FIG. 14), a first feed source F1, a first matching circuit 32, a first radiator 33, a second radiator 34, a second feed source F2, a second matching circuit 35, a third feed source F3, a third matching circuit 36, a ground portion G1, a fourth feed source F4, a third radiator 38, and a fourth matching circuit 39.

The housing 31 houses the wireless communication device 400. In this exemplary embodiment, the housing 31 includes a backboard 311 and a side frame 313. In this exemplary embodiment, the backboard 311 is made of non-metallic material, for example, plastic or glass. The side frame 313 is made of metallic material. The backboard 311 and the side frame 313 cooperatively form the housing of the wireless communication device 400.

The side frame 313 is substantially annular. The side frame 313 defines an opening (not labeled). The wireless communication device 400 includes a display 401 (shown in FIG. 15). The display 401 is received in the opening. The display 401 has a display surface. The display surface is exposed at the opening and is positioned parallel to the backboard 311. In this exemplary embodiment, the side frame 313 is positioned around a periphery of the backboard 311. The side frame 313 forms a receiving space 314 together with the display 401 and the backboard 311. The receiving space 314 can receive a printed circuit board, a processing unit, or other electronic components or modules.

In this exemplary embodiment, the side frame 313 includes an end portion 315, a first side portion 316, and a second side portion 317. In this exemplary embodiment, the end portion 315 is a top portion of the wireless communication device 400. The first side portion 316 is spaced apart from and parallel to the second side portion 317. The end portion 315 has first and second ends. The first side portion 316 is connected to the first end of the end portion 315 and the second side portion 317 is connected to the second end of the end portion 315. In this exemplary embodiment, the end portion 315, the first side portion 316, and the second side portion 317 are all perpendicularly connected to the backboard 311.

The side frame 313 further defines a first gap 319, a second gap 321, and a groove 322. The first gap 319 is defined at the first side portion 316. The first gap 319 passes through and extends to cut across the side frame 313. The second gap 321 is defined at the second side portion 317. The second gap 321 passes through and extends to cut across the side frame 313. The groove 322 is defined at the end portion 315 adjacent to the first gap 319. The groove 322 is positioned between the first gap 319 and the second gap 321. The groove 322 passes through and extends to cut across the side frame 313.

The side frame 313 is divided into two portions by the first gap 319, the second gap 321, and the groove 322. The two portions are a first radiating portion H1 and a second radiating portion H2. A first portion of the side frame 313 between the first gap 319 and the groove 322 forms the first radiating portion H1. A second portion of the side frame 313 between the second gap 321 and the groove 322 forms the second radiating portion H2. In this exemplary embodiment, the groove 322 is not positioned at a middle portion of the end portion 315. The second radiating portion H2 is longer than the first radiating portion H1.

In this exemplary embodiment, the first gap 319, the second gap 321, and the groove 322 are all filled with insulating material, for example, plastic, rubber, glass, wood, ceramic, or the like, thereby isolating the first radiating portion H1 and the second radiating portion H2.

In this exemplary embodiment, a width of the first gap 319, the second gap 321, and the groove 322 are all about 1.7 mm.

Figure 16:
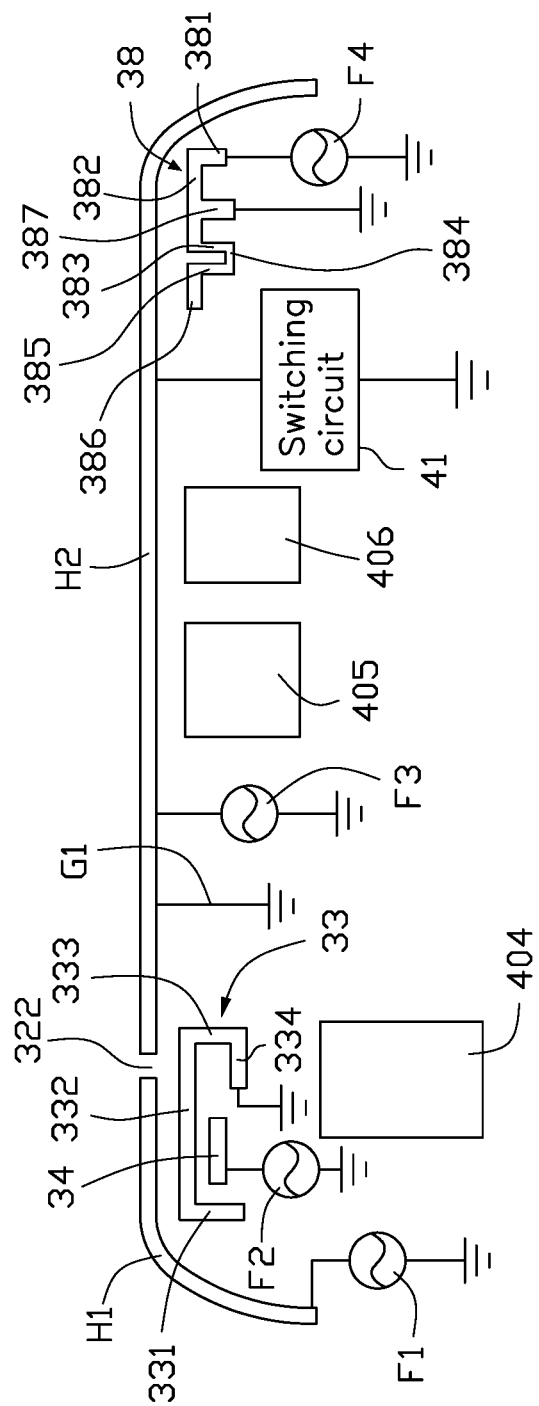
FIG. 16 is a circuit diagram of the antenna structure of FIG. 13.

As illustrated in FIG. 16, the first feed source F1 is positioned in the receiving space 314 adjacent to the first gap 319. One end of the first feed source F1 is electrically connected to the first radiating portion H1 through the first matching circuit 32 for feeding current to the first radiating portion H1. Another end of the first feed source F1 is grounded.

The first radiator 33 is positioned in the receiving space 314 adjacent to the first radiating portion H1. The first radiator 33 includes a first radiating arm 331, a second radiating arm 332, a third radiating arm 333, and a fourth radiating arm 334. The first radiating arm 331 is substantially arced and is substantially parallel to the first side portion 316.

The second radiating arm 332 is substantially rectangular. The second radiating arm 332 is perpendicularly connected to one end of the first radiating arm 331 adjacent to the end portion 315 and extends along a direction parallel to the end portion 315 and towards the second side portion 317. The extension continues until the second radiating arm 332 passes over the groove 322.

The third radiating arm 333 is substantially rectangular. One end of the third radiating arm 333 is perpendicularly connected to one end of the second radiating arm 332 away from the first radiating arm 331. Another end of the third radiating arm 333 extends along a direction parallel to the first side portion 316 and away from the end portion 315. In this exemplary embodiment, the first radiating arm 331 and the third radiating arm 333 are positioned at one side of the second radiating arm 332 away from the end portion 315. The first radiating arm 331, the second radiating arm 332, and the third radiating arm 333 cooperatively form a U-shaped structure.

The fourth radiating arm 334 is substantially rectangular. One end of the fourth radiating arm 334 is perpendicularly connected to one end of the third radiating arm 333 away from the second radiating arm 332. Another end of the fourth radiating arm 334 extends along a direction parallel to the end portion 315 and towards the first radiating arm 331, and the fourth radiating arm 334 is grounded.

The second radiator 34 is positioned in a space formed by the first radiator 33. The second radiator 34 is substantially a straight strip. The second radiator 34 is positioned parallel to and spaced apart from the second radiating arm 332. In this exemplary embodiment, the second radiating arm 332 is longer than the second radiator 34.

One end of the second feed source F2 is electrically connected to the second radiator 34 through the second matching circuit 35. The third feed source F3 is positioned in the receiving space 314 adjacent to the groove 322. One end of the third feed source F3 is electrically connected to the second radiating portion H2 through the second matching circuit 36 for feeding current to the second radiating portion H2. Another end of the third feed source F3 is grounded.

The ground portion G1 is positioned in the receiving space 314 between the groove 322 and the third feed source F3. One end of the ground portion G1 is electrically connected to the second radiating portion H2. Another end of the ground portion G1 is grounded for grounding the second radiating portion H2.

The third radiator 38 is positioned in the receiving space 314 adjacent to the second side portion 317. The third radiator 38 is substantially a meandering sheet. The third radiator 38 includes a feed section 381, a first connecting section 382, a second connecting section 383, a third connecting section 384, a fourth connecting section 385, a fifth connecting section 386, and a ground section 387. The feed section 381 is substantially rectangular. The feed section 381 is positioned parallel to and spaced apart from the second side portion 317. The feed section 381 extends along a direction towards the end portion 315.

The first connecting section 382 is substantially rectangular. The first connecting section 382 is perpendicularly connected to one end of the feed section 381 adjacent to the end portion 315, and extends along a direction parallel to the end portion 315 and towards the first side portion 316.

The second connecting section 383 is substantially rectangular. The second connecting section 383 is perpendicularly connected to one end of the first connecting section 382 away from the feed section 381, and extends along a direction parallel to the second side portion 317 and away from the first connecting section 382. In this exemplary embodiment, the second connecting section 383 and the feed section 381 are positioned at one side of the first connecting section 382 away from the end portion 315. The second connecting section 383, the feed section 381, and the first connecting section 382 cooperatively form a U-shaped structure.

The third connecting section 384 is substantially rectangular. The third connecting section 384 is perpendicularly connected to one end of the second connecting section 383 away from the first connecting section 382, and extends along a direction parallel to the end portion 315 and towards the first side portion 316.

The fourth connecting section 385 is substantially rectangular. The fourth connecting section 385 is perpendicularly connected to one end of the third connecting section 384 away from the second connecting section 383, and extends along a direction parallel to the first side portion 316 and towards the end portion 315. The fourth connecting section 385, the third connecting section 384, and the second connecting section 383 cooperatively form a U-shaped structure.

The fifth connecting section 386 is substantially rectangular. The fifth connecting section 386 is perpendicularly connected to one end of the fourth connecting section 385 away from the third connecting section 384, and extends along a direction parallel to the end portion 315 and towards the first side portion 316.

The ground section 387 is substantially rectangular. The ground section 387 is positioned between the feed section 381 and the second connecting section 383. The ground section 387 is positioned parallel to and spaced apart from both the feed section 381 and the second connecting section 383. One end of the ground section 387 is perpendicularly connected to one side of the first connecting section 382, and extends along a direction parallel to the feed section 381 and away from the end portion 315. Another end of the ground section 387 is grounded.

In this exemplary embodiment, the first connecting section 382 is substantially collinear with the fifth connecting section 386. The feed section 381, the second connecting section 383, the third connecting section 384, the fourth connecting section 385, and the ground section 387 are all positioned at one side of the first connecting section 382 and the fifth connecting section 386.

The fourth feed source F4 is positioned in the receiving space 314 adjacent to the second gap 321. One end of the fourth feed source F4 is electrically connected to one end of the feed section 381 away from the first connecting section 382 through the fourth matching circuit 39, for feeding current to the third radiator 38. Another end of the fourth feed source F4 is grounded. One end of the ground section 387 away from the first connecting section 382 is grounded for grounding the third radiator 38.

In this exemplary embodiment, when the first feed source F1 supplies current, the current flows through the first radiating portion H1 to activate a first mode to generate radiation signals in a first frequency band. When the first feed source F1 supplies current, the current further flows through the first radiating portion H1 and is coupled to the first radiator 33 through the first radiating portion H1 to activate a second mode to generate radiation signals in a second frequency band.

When the second feed source F2 supplies current, the current flows through the second radiator 34 to activate a third mode to generate radiation signals in a third frequency band. When the third feed source F3 supplies current, the current flows through the second radiating portion H2 and is grounded through the ground portion G1 to activate a fourth mode to generate radiation signals in a fourth frequency band. When the fourth feed source F4 supplies current, the current flows through the third radiator 38 and is grounded through the ground section 387 of the third radiator 38 to activate a fifth mode to generate radiation signals in a fifth frequency band.

In this exemplary embodiment, the first mode is a GPS operation mode, the second mode is a WIFI 2.4 GHz operation mode, the third mode is a WIFI 5 GHz operation mode, the fourth mode includes LTE-A low and middle frequency operation modes, and the fifth mode is a LTE-A high frequency operation mode.

The first radiating portion H1 and the first feed source F1 cooperatively form a GPS antenna. The first radiating portion H1, the first feed source F1, and the first radiator 33 cooperatively form a coupling-feed antenna. The second feed source F2 and the second radiator 34 cooperatively form a monopole antenna. The third feed source F3, the second radiating portion H2, and the ground portion G1 cooperatively form an inverted-F type diversity antenna. The fourth feed source F4 and the third radiator 38 cooperatively form an inverted-F type diversity antenna.

Figure 17:
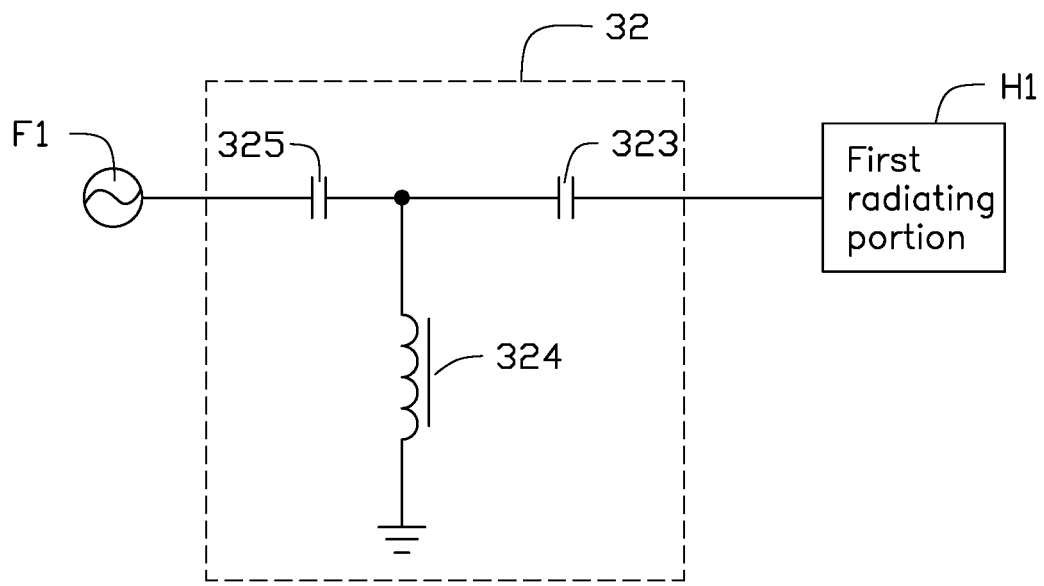
FIG. 17 is a circuit diagram of a first matching circuit of the antenna structure of FIG. 13.

As illustrated in FIG. 17, in this exemplary embodiment, the first matching circuit 32 includes a first matching element 323, a second matching element 324, and a third matching element 325. One end of the first matching element 323 is electrically connected to the first radiating portion H1. Another end of the first matching element 323 is grounded through the second matching element 324. One end of the third matching element 325 is electrically connected between the first matching element 323 and the second matching element 324. Another end of the third matching element 325 is electrically connected to the first feed source F1.

In this exemplary embodiment, the first matching element 323 and the second matching element 324 are used for adjusting the GPS operation mode. The third matching element 325 is used for adjusting the WIFI 2.4 GHz operation mode. The first matching element 323 and the third matching element 325 are both capacitors. The second matching element 324 is an inductor. Capacitance values of the first matching element 323 and the third matching element 325 are 3 pF and 1.8 pF, respectively. An inductance value of the second matching element 324 is 0.8 nH.

In other exemplary embodiments, the first matching element 323, the second matching element 324, and the third matching element 325 are not limited to be inductors and capacitors, and can be other matching elements or a combination.

Figure 18:
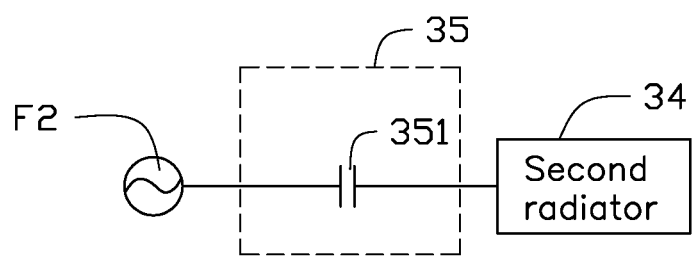
FIG. 18 is a circuit diagram of a second matching circuit of the antenna structure of FIG. 13.

As illustrated in FIG. 18, the second matching circuit 35 includes a matching element 351. One end of the matching element 351 is electrically connected to the second radiator 34. Another end of the matching element 351 is electrically connected to the second feed source F2 for impedance matching the third frequency band. In this exemplary embodiment, the matching element 351 is a capacitor and a capacitance value of the matching element 351 is 2 pF. In other exemplary embodiments, the matching element 351 is not limited to be a capacitor, and can be an inductor, other matching elements or a combination.

Figure 19:
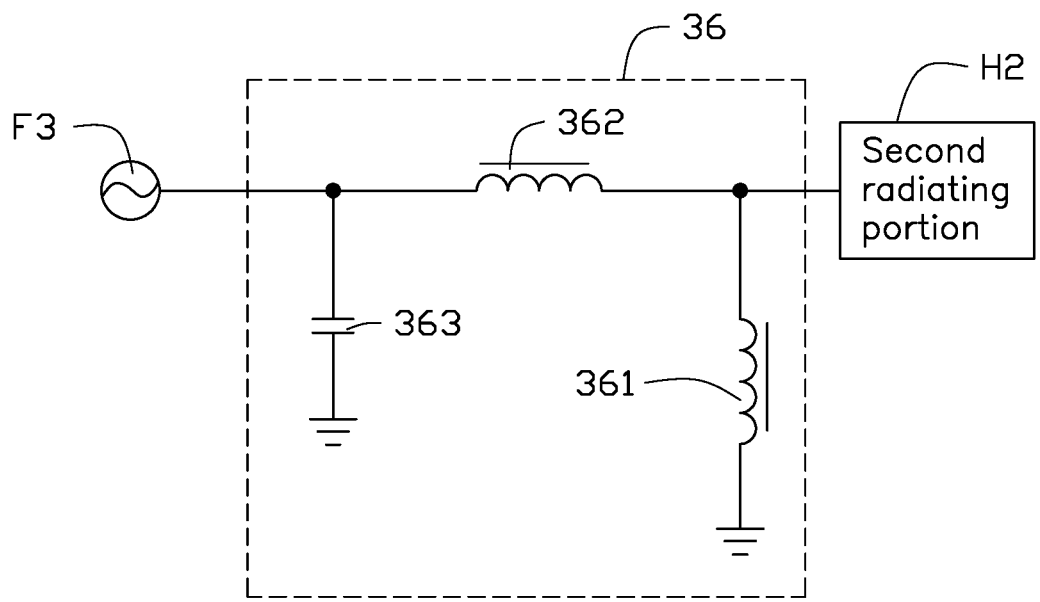
FIG. 19 is a circuit diagram of a third matching circuit of the antenna structure of FIG. 13.

As illustrated in FIG. 19, the third matching circuit 36 includes a first matching unit 361, a second matching unit 362, and a third matching unit 363. One end of the first matching unit 361 is electrically connected to the second radiating portion H2. Another end of the first matching unit 361 is grounded. One end of the second matching unit 362 is electrically connected to the second radiating portion H2 and one end of the first matching unit 361. Another end of the second matching unit 362 is electrically connected to the third feed source F3 and one end of the third matching unit 363. Another end of the third matching unit 363 is grounded.

In this exemplary embodiment, the first matching unit 361 and the second matching unit 362 are both inductors. The third matching unit 363 is a capacitor. Inductance values of the first matching unit 361 and the second matching unit 362 are 8.2 nH and 0.5 nH, respectively. A capacitance value of the third matching unit 363 is about 1 pF.

In other exemplary embodiments, the first matching unit 361, the second matching unit 362, and the third matching unit 363 are not limited to be inductors and capacitors, and can be other matching elements or a combination.

Figure 20:
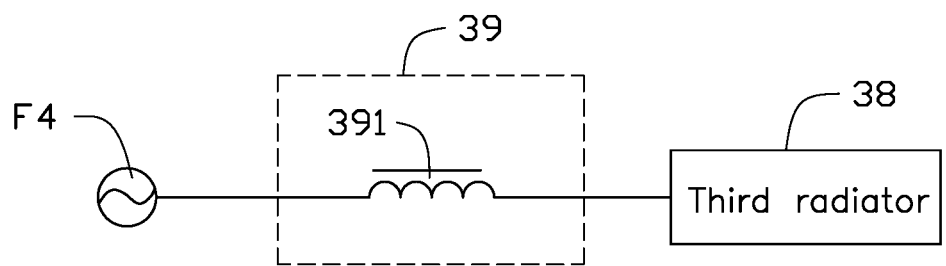
FIG. 20 is a circuit diagram of a fourth matching circuit of the antenna structure of FIG. 13.

As illustrated in FIG. 20, the fourth matching circuit 39 includes a matching unit 391. One end of the matching unit 391 is electrically connected to the third radiator 38. Another end of the matching unit 391 is electrically connected to the fourth feed source F4 for impedance matching the fifth frequency band. In this exemplary embodiment, the matching unit 391 is an inductor and an inductance value of the matching unit 391 is 1 nH. In other exemplary embodiments, the matching unit 391 is not limited to be an inductance, and can be a capacitor, other matching elements or a combination.

Figure 21:
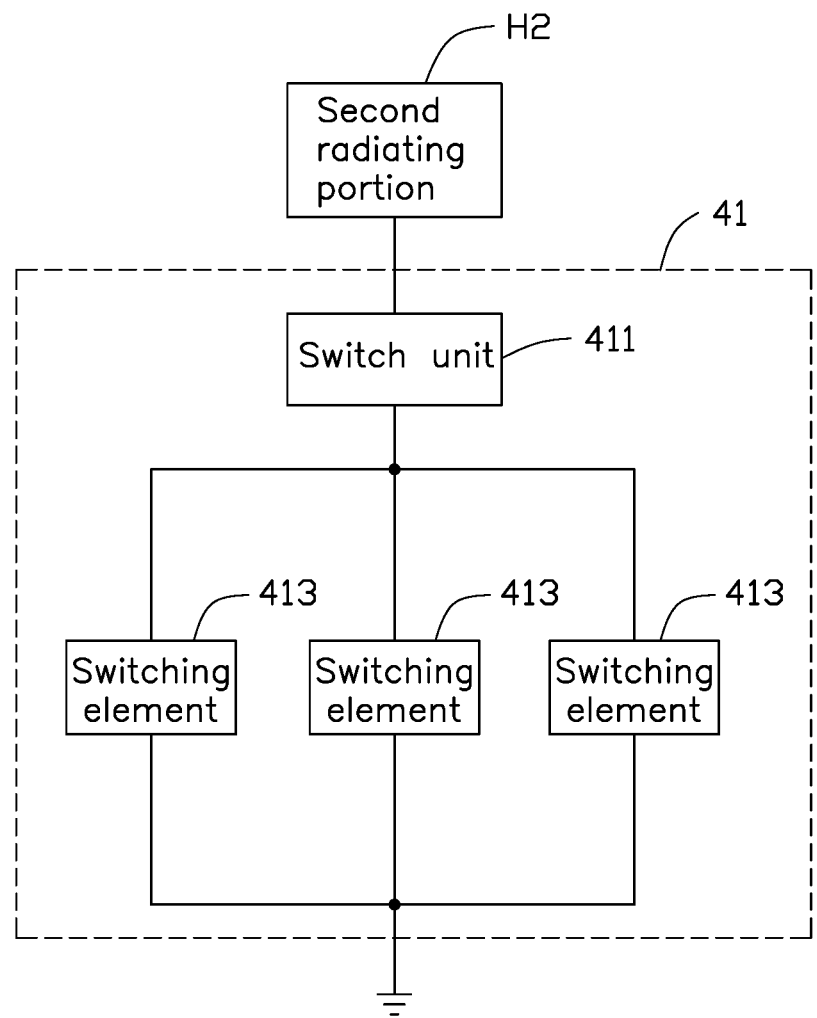
FIG. 21 is a circuit diagram of a switching circuit of the antenna structure of FIG. 13.

As illustrated in FIG. 13, FIG. 16, and FIG. 21, in this exemplary embodiment, the antenna structure 300 further includes a switching circuit 41. The switching circuit 41 is positioned in the receiving space 314 between the third feed source F3 and the third radiator 38. One end of the switching circuit 41 is electrically connected to the second radiating portion H2. Another end of the switching circuit 41 is grounded. The switching circuit 41 includes a switch unit 411 and a plurality of switching elements 413. The switch unit 411 is electrically connected to the second radiating portion H2. The switching elements 413 can be an inductor, a capacitor, or a combination of the inductor and the capacitor. The switching elements 413 are connected in parallel to each other. One end of each switching element 413 is electrically connected to the switch unit 411. The other end of each switching element 413 is grounded.

Through control of the switch unit 411, the second radiating portion H2 can be switched to connect with different switching elements 413. Since each switching element 413 has a different impedance, an operating frequency band of the fourth mode can be adjusted.

For example, in this exemplary embodiment, the switching circuit 41 includes three switching elements 413. The three switching elements 413 are all inductors. Inductance values of the three switching elements 413 are about 33 nH, 7.5 nH, and 5.6 nH, respectively. When the switching circuit 41 is switched to connect with the switching element 413 having an inductance value of about 33 nH, the antenna structure 300 can work at a frequency band of about 758-803 MHz. When the switching circuit 41 is switched to connect with the switching element 413 having an inductance value of about 7.5 nH, the antenna structure 300 can work at a frequency band of about 850 MHz. When the switching circuit 41 is switched to connect with the switching element 413 having an inductance value of about 5.6 nH, the antenna structure 300 can work at a frequency band of about 900 MHz. Through switching of the switching unit 411, the low frequency band of the antenna structure 300 can cover 703-960 MHz.

As illustrated in FIG. 13, in this exemplary embodiment, the wireless communication device 400 further includes a first holder 402 and a second holder 403. The first holder 402 is used to hold the first radiator 33 and the second radiator 34. The second holder 403 is used to hold the third radiator 38. The first feed source F1 is also positioned on the first holder 402.

As illustrated in FIG. 13 and FIG. 16, the wireless communication device 400 further includes at least one electronic element. In this exemplary embodiment, the wireless communication device 400 includes at least a first electronic element 404, a second electronic element 405, and a third electronic element 406. In this exemplary embodiment, the first electronic element 404 is a main camera module. The first electronic element 404 is positioned at one side of the first radiator 33 away from the end portion 315 and is approximately aligned with the gap 322. The second electronic element 405 is a front camera module. The third electronic element 406 is a receiver. The second electronic element 405 and the third electronic element 406 are spaced apart from each other. The second electronic element 405 and the third electronic element 406 are positioned between the third feed source F3 and the switching circuit 41.

Figure 22:
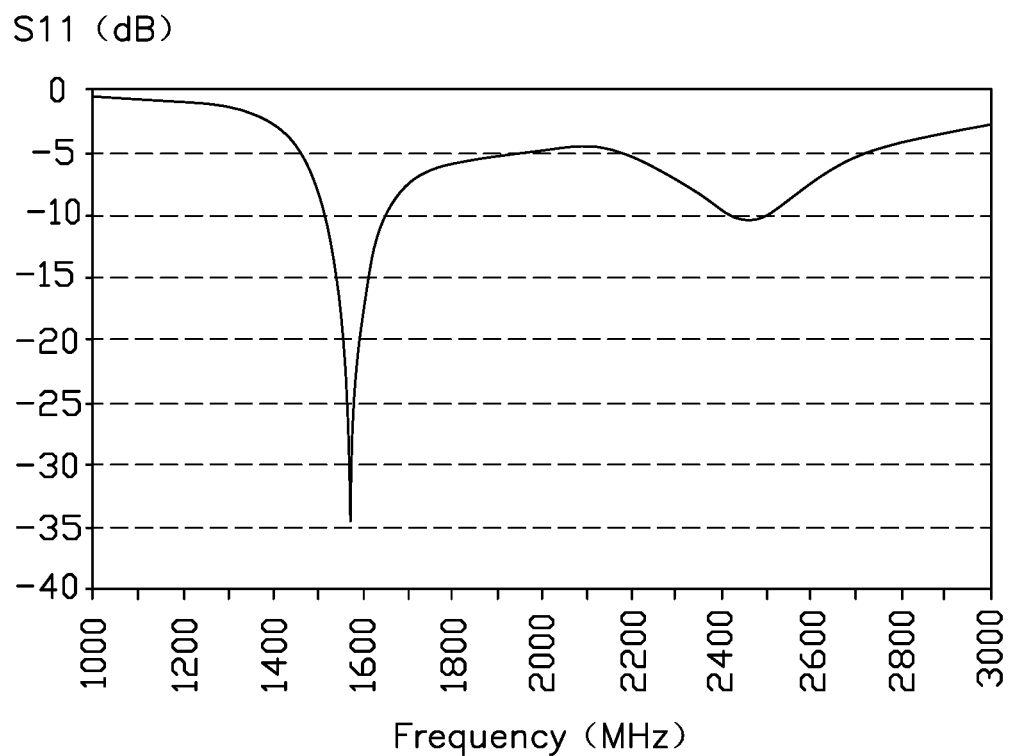
FIG. 22 is a scattering parameter graph when the antenna structure of FIG. 13 works at a Global Positioning System (GPS) operation mode and a WIFI 2.4 GHz operation mode.
Figure 23:
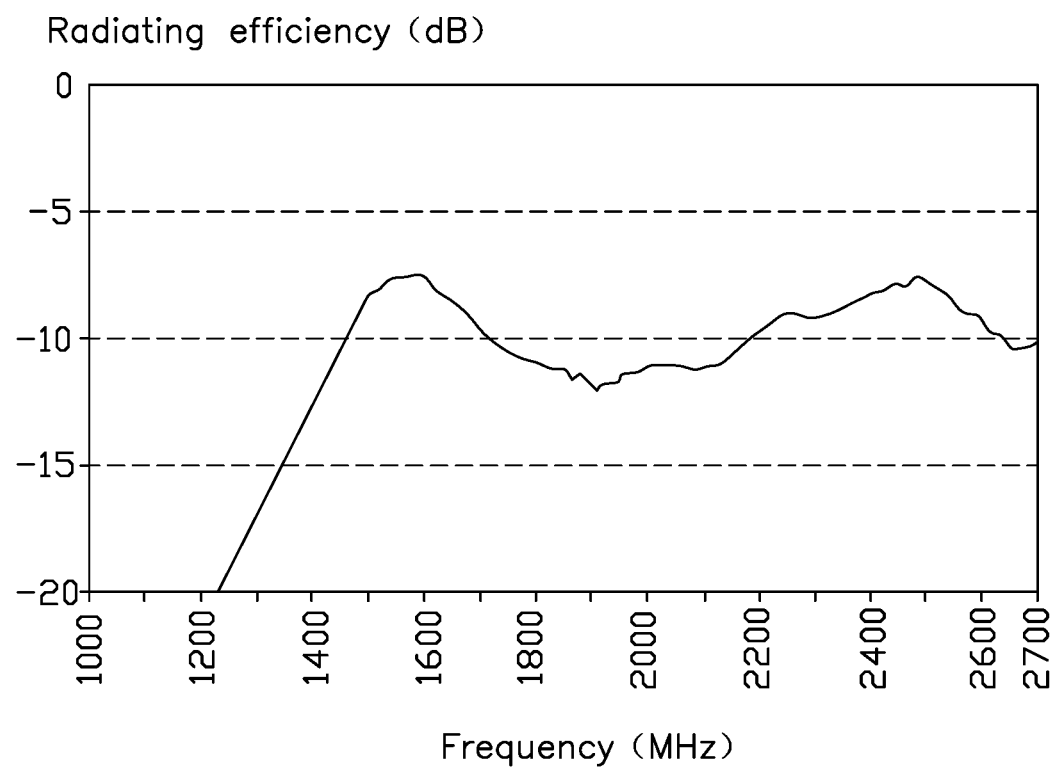
FIG. 23 is a total radiating efficiency graph when the antenna structure of FIG. 13 works at the GPS operation mode and the WIFI 2.4 GHz operation mode.

FIG. 22 illustrates a scattering parameter graph when the antenna structure 300 works at the GPS operation mode and the WIFI 2.4 GHz operation mode. FIG. 23 illustrates a radiating efficiency graph when the antenna structure 300 works at the GPS operation mode and the WIFI 2.4 GHz operation mode.

Figure 24:
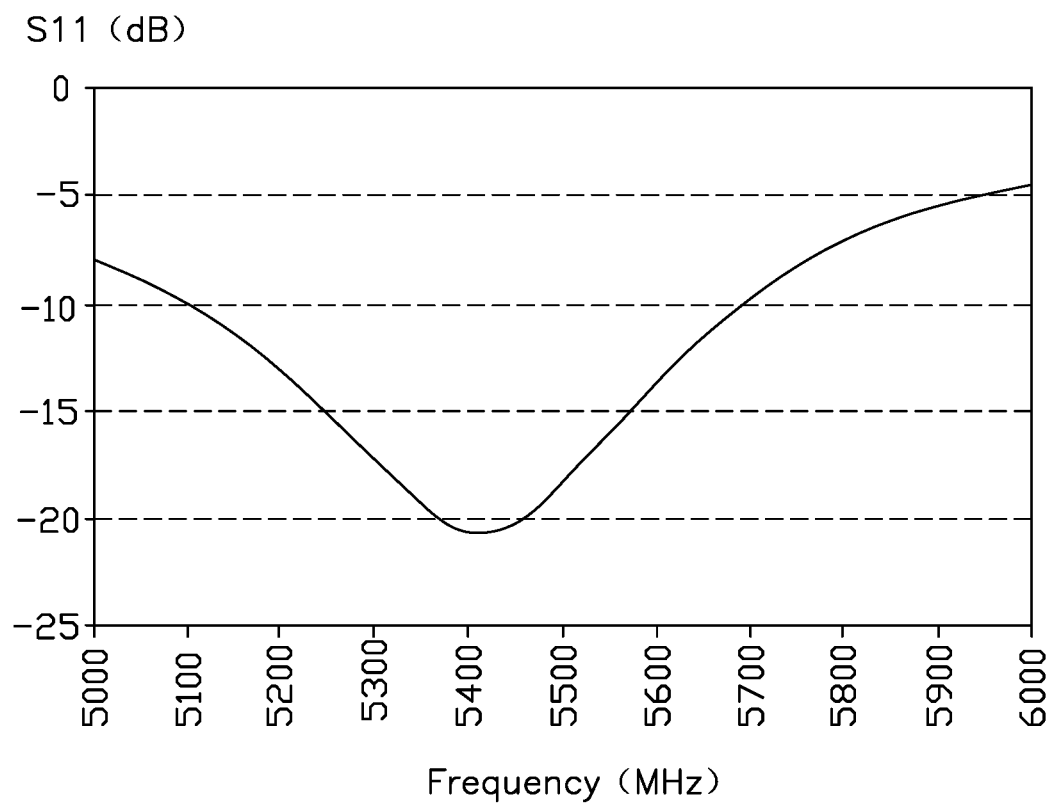
FIG. 24 is a scattering parameter graph when the antenna structure of FIG. 13 works at a WIFI 5 GHz operation mode.
Figure 25:
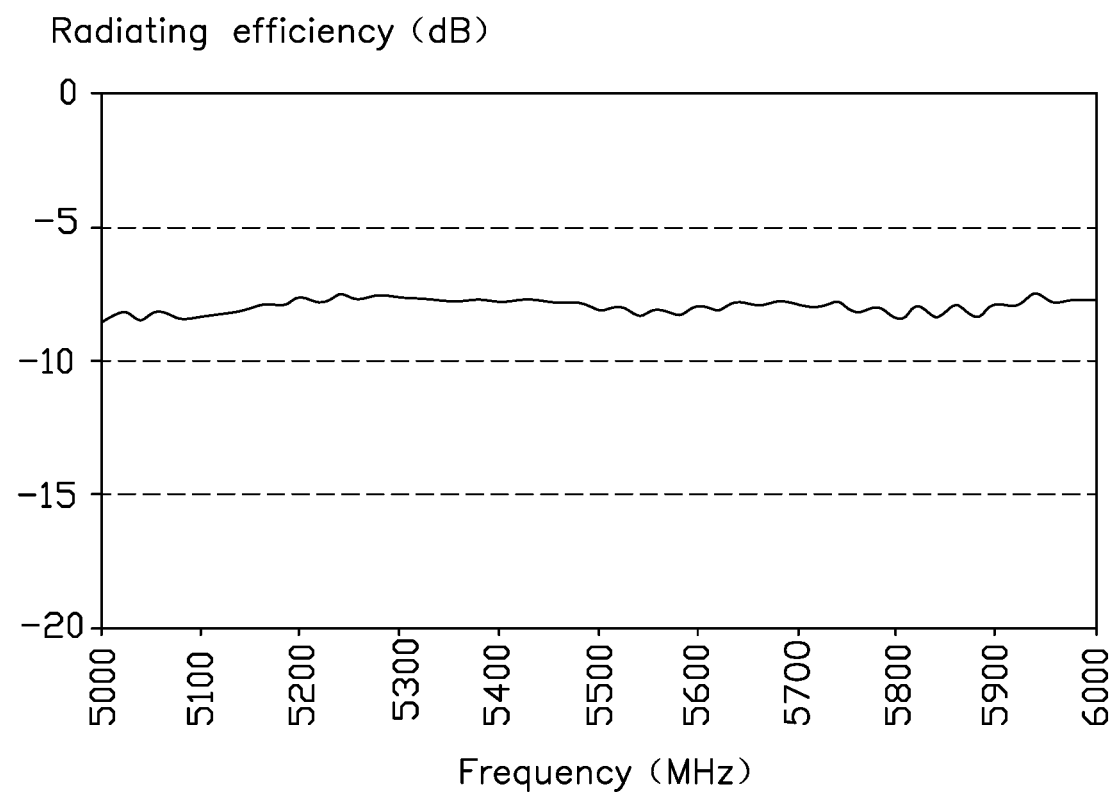
FIG. 25 is a total radiating efficiency graph when the antenna structure of FIG. 13 works at the WIFI 5 GHz operation mode.

FIG. 24 illustrates a scattering parameter graph when the antenna structure 300 works at the WIFI 5 GHz operation mode. FIG. 25 illustrates a radiating efficiency graph when the antenna structure 300 works at the WIFI 5 GHz operation mode.

Figure 26:
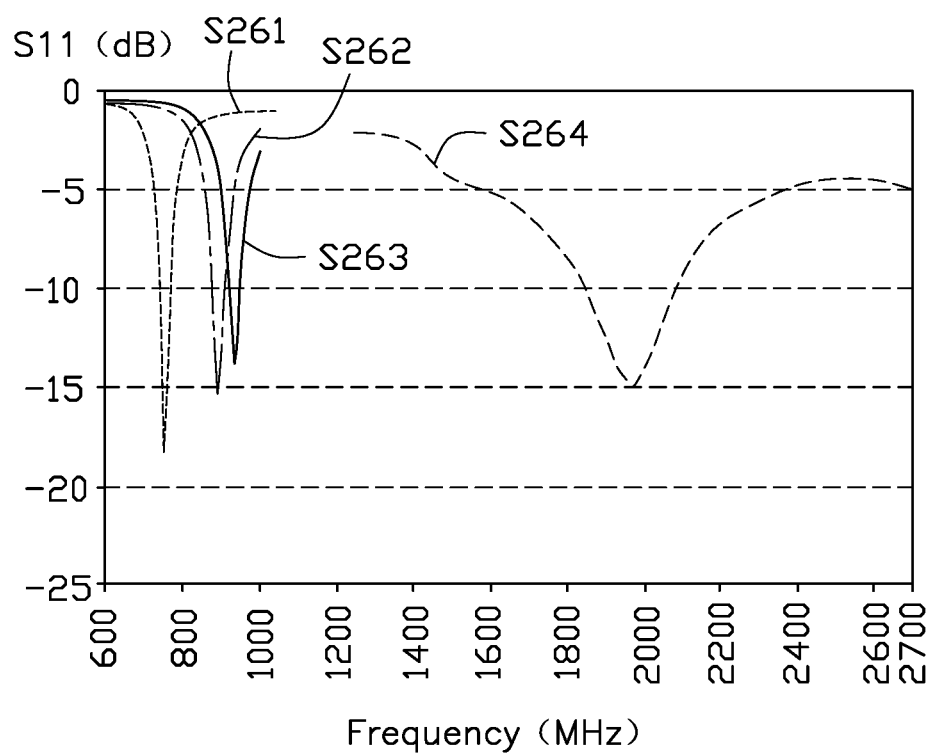
FIG. 26 is a scattering parameter graph when the antenna structure of FIG. 13 works at LTE-A low and middle frequency operation modes.

FIG. 26 illustrates a scattering parameter graph when the antenna structure 300 works at LTE-A low and middle frequency operation modes. Curve 261 illustrates a scattering parameter when the antenna structure 300 works at a frequency band of about LTE-A 700 MHz. Curve 262 illustrates a scattering parameter when the antenna structure 300 works at a frequency band of about LTE-A 850 MHz. Curve 263 illustrates a scattering parameter when the antenna structure 300 works at a frequency band of about LTE-A 900 MHz. Curve 264 illustrates a scattering parameter when the antenna structure 300 works at the LTE-A middle frequency band. The curves S261-S263 respectively correspond to three different frequency bands, and respectively correspond to three of multiple low frequency operation modes that the switching circuit 41 can be switched.

Figure 27:
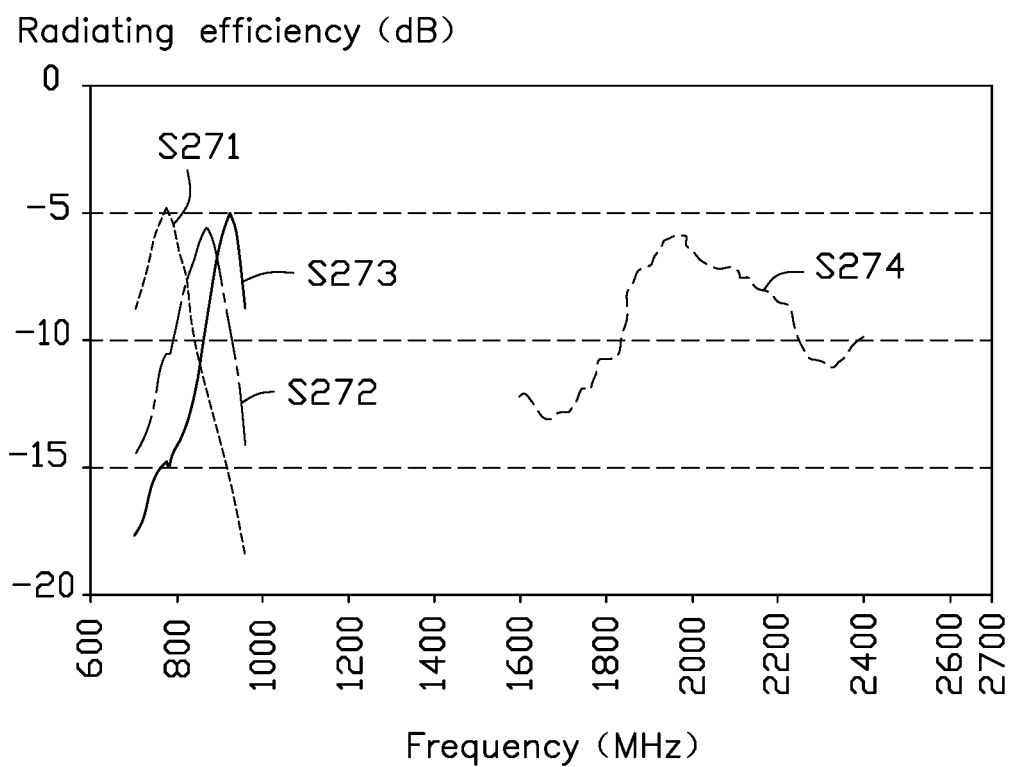
FIG. 27 is a total radiating efficiency graph when the antenna structure of FIG. 13 works at the LTE-A low and middle frequency operation modes.

FIG. 27 illustrates a radiating efficiency graph when the antenna structure 300 works at the LTE-A low and middle frequency operation modes. Curve 271 illustrates a radiating efficiency when the antenna structure 300 works at a frequency band of about LTE-A 700 MHz. Curve 272 illustrates a radiating efficiency when the antenna structure 300 works at a frequency band of about LTE-A 850 MHz. Curve 273 illustrates a radiating efficiency when the antenna structure 300 works at a frequency band of about LTE-A 900 MHz. Curve 274 illustrates a radiating efficiency when the antenna structure 300 works at the LTE-A middle frequency band.

Figure 28:
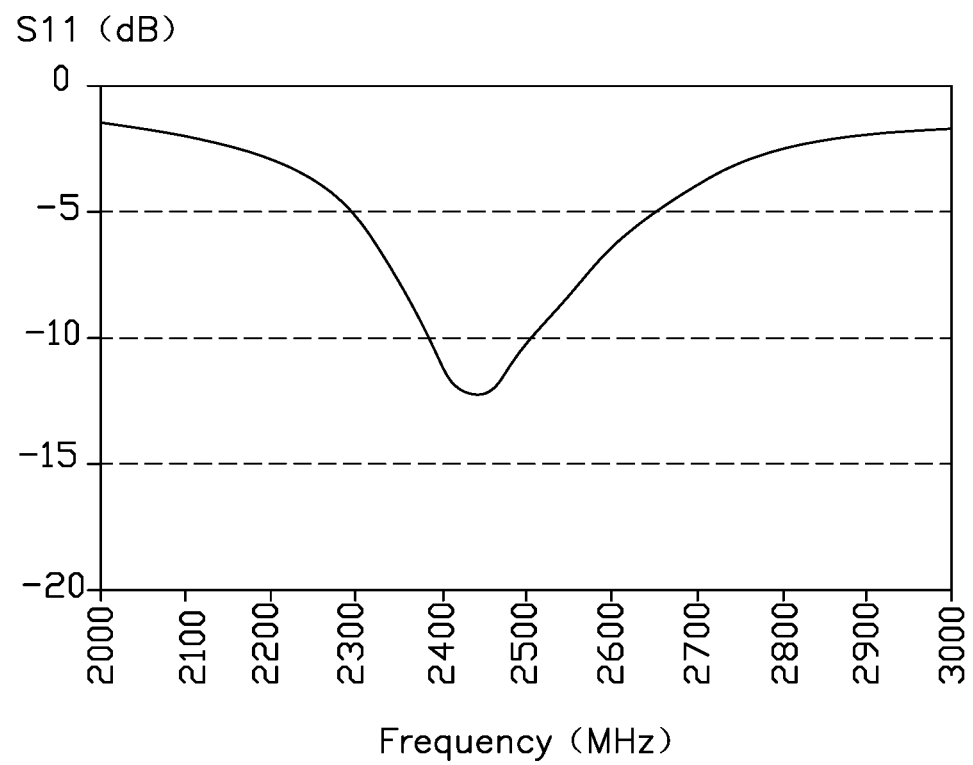
FIG. 28 is a scattering parameter graph when the antenna structure of FIG. 13 works at a LTE-A high frequency operation mode.
Figure 29:
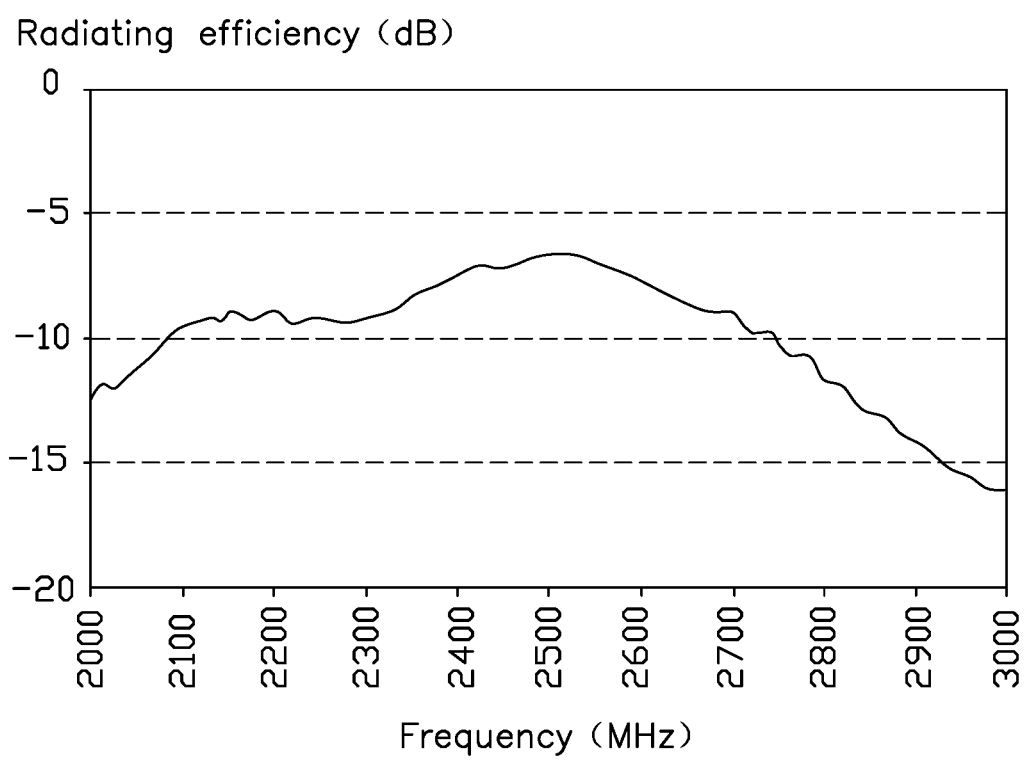
FIG. 29 is a total radiating efficiency graph when the antenna structure of FIG. 13 works at the LTE-A high frequency operation mode.

FIG. 28 illustrates a scattering parameter graph when the antenna structure 300 works at the LTE-A high frequency operation mode. FIG. 29 illustrates a radiating efficiency graph when the antenna structure 300 works at the LTE-A high frequency operation mode.

As illustrated in FIG. 22 to FIG. 29, the antenna structure 300 may work at corresponding LTE-A low, middle, and high frequency bands. The antenna structure 300 may also work at a GPS frequency band and WIFI 2.4/5 GHz frequency band. That is, the antenna structure 300 may completely cover the LTE-A low, middle, and high frequency bands, the GPS frequency band, and the WIFI 2.4/5 GHz frequency band. When the antenna structure 300 works at these frequency bands, the antenna structure 300 has a good radiating efficiency, which satisfies antenna design requirements.

As described above, the antenna structure 300 defines the second gap 321 and the groove 322, then the second gap 321 and the groove 322 separate a second radiating portion H2 from the side frame 313. The antenna structure 300 further includes the third radiator 38. The second radiating portion H2 activates the fourth mode to generate radiation signals in the LTE-A low and middle frequency bands. The third radiator 38 activates the fifth mode to generate radiation signals in the LTE-A high frequency band. The wireless communication device 400 can use CA technology of LTE-A and use the second radiating portion H2 and the third radiator 38 to receive or send wireless signals at multiple frequency bands simultaneously.

In addition, the antenna structure 300 includes the housing 31. The first gap 319, the second gap 321, and the groove 322 are all defined on the side frame 313 instead of the backboard 311. Then the antenna structure 300 can only use the side frame 313 and the radiators, for example, the first radiator 33, the second radiator 34, and the third radiator 38 to activate corresponding LTE-A low, middle, and high frequency bands, GPS frequency band, and the WIFI 2.4/5 GHz frequency band. Then the backboard 311 can be entirely made of non-metallic material, which is complete and beautiful, and can effectively adapt to a trend of a miniaturization of antenna clearance areas, and can also effectively ensure a stability of wireless signal reception.

The antenna structure 100 of exemplary embodiment 1 and the antenna structure 300 of exemplary embodiment 2 can both be applied to one wireless communication device. For example, the antenna structure 100 can be positioned at a lower portion of the wireless communication device to serve as a main antenna. The antenna structure 300 can be positioned at an upper portion of the wireless communication device to serve as a secondary antenna. When the wireless communication device sends wireless signals, the wireless communication device can use the antenna structure 100 to send wireless signals. When the wireless communication device receives wireless signals, the wireless communication device can use the antenna structure 100 and antenna structure 300 to receive wireless signals.

The embodiments shown and described above are only examples. Many details are often found in the art such as the other features of the antenna structure and the wireless communication device. Therefore, many such details are neither shown nor described. Even though numerous characteristics and advantages of the present disclosure have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An antenna structure comprising:
a housing, the housing comprising a first radiating portion;
a first feed source, the first feed source electrically connected to the first radiating portion for feeding current to the first radiating portion and the first radiating portion activating a first mode to generate radiation signals in a first frequency band;
a first radiator, the first radiator positioned in the housing and spaced apart from the first radiating portion, the first radiating portion further coupling the current to the first radiator and the first radiator activating a second mode to generate radiation signals in a second frequency band;
a second radiator, the second radiator positioned in a space formed by the first radiator, the second radiator positioned spaced apart from the first radiator; and
a second feed source, the second feed source electrically connected to the second radiator for feeding current to the second radiator and the second radiator activating a third mode to generate radiation signals in a third frequency band;
wherein a frequency of the third frequency band is higher than a frequency of the second frequency band, and a frequency of the second frequency band is higher than a frequency of the first frequency band.

2. The antenna structure of claim 1, wherein the housing comprises a side frame, the side frame defines a first gap and a groove, the first gap and the groove both pass through and extend to cut across the side frame; and wherein the side frame between the first gap and the groove forms the first radiating portion.

3. The antenna structure of claim 2, wherein the side frame comprises an end portion, a first side portion, and a second side portion, the first side portion and the second side portion are respectively connected to two ends of the end portion; the first gap is defined at the first side portion, the groove is defined at the end portion; wherein the first radiator comprises a first radiating arm, a second radiating arm, a third radiating arm, and a fourth radiating arm; wherein the first radiating arm is substantially parallel to the first side portion, the second radiating arm is perpendicularly connected to one end of the first radiating arm adjacent to the end portion and extends along a direction parallel to the end portion and towards the second side portion until the second radiating arm passes over the groove; wherein the third radiating arm is perpendicularly connected to one end of the second radiating arm away from the first radiating arm and extends along a direction parallel to the first side portion and away from the end portion; wherein the fourth radiating arm is perpendicularly connected to one end of the third radiating arm away from the second radiating arm and extends along a direction parallel to the end portion and towards the first radiating arm, and the fourth radiating arm is grounded.

4. The antenna structure of claim 3, wherein the second radiator is substantially a straight strip, the second radiator is positioned parallel to and spaced apart from the second radiating arm.

5. The antenna structure of claim 3, further comprising a third feed source and a ground portion, wherein the housing further comprises a second radiating portion, the ground portion is electrically connected to the second radiating portion for grounding the second radiating portion; wherein one end of the third feed source is electrically connected to the second radiating portion for feeding current to the second radiating portion and the second radiating portion activates a fourth mode to generate radiation signals in a fourth frequency band.

6. The antenna structure of claim 5, wherein the side frame further defines a second gap, the second gap passes through and extends to cut across the side frame; and wherein the side frame between the second gap and the groove forms the second radiating portion.

7. The antenna structure of claim 6, wherein the first gap, the second gap, and the groove are all filled with insulating material.

8. The antenna structure of claim 5, further comprising a switching circuit, wherein the switching circuit comprises a switching unit and a plurality of switching elements, the switching unit is electrically connected to the second radiating portion, the switching elements are connected in parallel to each other, one end of each switching element is electrically connected to the switching unit and the other end of each switching element is grounded; through controlling the switching unit, the switching unit is switched to connect with different switching elements for adjusting the fourth frequency band.

9. The antenna structure of claim 5, further comprising a fourth feed source and a third radiator, wherein the third radiator is positioned in the housing and spaced apart from the second radiating portion; wherein the fourth feed source is electrically connected to the third radiator for feeding current to the third radiator and the third radiator activates a fifth mode to generate radiation signals in a fifth frequency band; and wherein a frequency of the fifth frequency band is higher than a frequency of the fourth frequency band.

10. The antenna structure of claim 9, wherein the third radiator comprises a feed section, a first connecting section, a second connecting section, a third connecting section, a fourth connecting section, a fifth connecting section, and a ground section; wherein the feed section is positioned parallel to and spaced apart from the second side portion, and extends along a direction towards the end portion; wherein the first connecting section is perpendicularly connected to one end of the feed section adjacent to the end portion and extends along a direction parallel to the end portion and towards the first side portion; wherein the second connecting section is perpendicularly connected to one end of the first connecting section away from the feed section and extends along a direction parallel to the second side portion and away from the first connecting section; wherein the third connecting section is perpendicularly connected to one end of the second connecting section away from the first connecting section and extends along a direction parallel to the end portion and towards the first side portion; wherein the fourth connecting section is perpendicularly connected to one end of the third connecting section away from the second connecting section and extends along a direction parallel to the first side portion and towards the end portion; wherein the fifth connecting section is perpendicularly connected to one end of the fourth connecting section away from the third connecting section and extends along a direction parallel to the end portion and towards the first side portion; wherein the ground section is positioned between the feed section and the second connecting section, the ground section is positioned parallel to and spaced apart from both the feed section and the second connecting section, one end of the ground section is perpendicularly connected to one side of the first connecting section and extends along a direction parallel to the feed section and away from the end portion, another end of the ground section is grounded.

11. The antenna structure of claim 9, wherein a wireless communication device uses the second radiating portion and the third radiator to receive or send wireless signals at multiple frequency bands simultaneously through carrier aggregation (CA) technology of Long Term Evolution Advanced (LTE-A).

12. The antenna structure of claim 1, wherein the housing further comprises a backboard, the side frame is positioned around a periphery of the backboard, and the backboard is made of non-metallic material.

13. The antenna structure of claim 1, further comprising a first signal source, the housing further comprises a side frame, the side frame defines a gap, the gap passes through and extends to cut across the side frame, and the side frame is divided into a coupling portion and a first radiating section; wherein the first signal source is positioned in the housing and is electrically connected to the first radiating section, the first signal source divides the first radiating section into a first branch and a second branch; wherein when the first signal source supplies current, the current flows through the first branch and the first branch activates a first operation mode to generate radiation signals in a first radiation frequency band; wherein the current further flows through the second branch and is coupled to the coupling portion through the gap, and the coupling portion activates a second operation mode to generate radiation signals in a second radiation frequency band.

14. The antenna structure of claim 13, further comprising a switching module, wherein the switching module comprises a switch and a plurality of switching components, the switch is electrically connected to the first radiating section, the switching components are connected in parallel to each other, one end of each switching component is electrically connected to the switch and the other end of each switching component is grounded; through controlling the switch, the switch is switched to connect with different switching components for adjusting the first radiation frequency band.

15. The antenna structure of claim 13, wherein the side frame further defines a groove, the groove passes through and extends to cut across the side frame; wherein the side frame between the gap and the groove forms the first radiating section.

16. The antenna structure of claim 15, wherein the gap and the groove are both filled with insulating material.

17. The antenna structure of claim 15, wherein the side frame comprises an end portion, a first side portion, and a second side portion, the first side portion and the second side portion are respectively connected to two ends of the end portion; wherein the gap and the groove are both defined at the end portion; wherein a portion of the side frame extending from the groove away from the gap and adjacent to the second side portion forms a second radiating section; wherein the antenna structure further comprises a second signal source, the second signal source is electrically connected to the second radiating section for feeding current to the second radiating section, and the second radiating section activates a third operation mode to generate radiation signals in a third radiation frequency band.

18. The antenna structure of claim 17, wherein a frequency of the third radiation frequency band is higher than a frequency of the second radiation frequency band, a frequency of the second radiation frequency band is higher than a frequency of the first radiation frequency band.

19. The antenna structure of claim 17, wherein a wireless communication device uses the first radiating section, the second radiating section, and the coupling portion to receive or send wireless signals at multiple frequency bands simultaneously through CA technology of LTE-A.

20. A wireless communication device comprising:
an antenna structure, the antenna structure comprising:
a housing, the housing comprising a first radiating portion;
a first feed source, the first feed source electrically connected to the first radiating portion for feeding current to the first radiating portion and the first radiating portion activating a first mode to generate radiation signals in a first frequency band;
a first radiator, the first radiator positioned in the housing and spaced apart from the first radiating portion, the first radiating portion further coupling the current to the first radiator and the first radiator activating a second mode to generate radiation signals in a second frequency band;
a second radiator, the second radiator positioned in a space formed by the first radiator, the second radiator positioned spaced apart from the first radiator; and
a second feed source, the second feed source electrically connected to the second radiator for feeding current to the second radiator and the second radiator activating a third mode to generate radiation signals in a third frequency band;
wherein a frequency of the third frequency band is higher than a frequency of the second frequency band, and a frequency of the second frequency band is higher than a frequency of the first frequency band.

21. The wireless communication device of claim 20, wherein the housing comprises a side frame, the side frame defines a first gap and a groove, the first gap and the groove both pass through and extend to cut across the side frame; and wherein the side frame between the first gap and the groove forms the first radiating portion.

22. The wireless communication device of claim 21, wherein the side frame comprises an end portion, a first side portion, and a second side portion, the first side portion and the second side portion are respectively connected to two ends of the end portion; the first gap is defined at the first side portion, the groove is defined at the end portion; wherein the first radiator comprises a first radiating arm, a second radiating arm, a third radiating arm, and a fourth radiating arm; wherein the first radiating arm is substantially parallel to the first side portion, the second radiating arm is perpendicularly connected to one end of the first radiating arm adjacent to the end portion and extends along a direction parallel to the end portion and towards the second side portion until the second radiating arm passes over the groove; wherein the third radiating arm is perpendicularly connected to one end of the second radiating arm away from the first radiating arm and extends along a direction parallel to the first side portion and away from the end portion; wherein the fourth radiating arm is perpendicularly connected to one end of the third radiating arm away from the second radiating arm and extends along a direction parallel to the end portion and towards the first radiating arm, and the fourth radiating arm is grounded.

23. The wireless communication device of claim 22, wherein the second radiator is substantially a straight strip, the second radiator is positioned parallel to and spaced apart from the second radiating arm.

24. The wireless communication device of claim 22, wherein the antenna structure further comprises a third feed source and a ground portion, the housing further comprises a second radiating portion, the ground portion is electrically connected to the second radiating portion for grounding the second radiating portion; wherein one end of the third feed source is electrically connected to the second radiating portion for feeding current to the second radiating portion and the second radiating portion activates a fourth mode to generate radiation signals in a fourth frequency band.

25. The wireless communication device of claim 24, wherein the side frame further defines a second gap, the second gap passes through and extends to cut across the side frame; and wherein the side frame between the second gap and the groove forms the second radiating portion.

26. The wireless communication device of claim 24, wherein the antenna structure further comprises a fourth feed source and a third radiator, the third radiator is positioned in the housing and spaced apart from the second radiating portion; wherein the fourth feed source is electrically connected to the third radiator for feeding current to the third radiator and the third radiator activates a fifth mode to generate radiation signals in a fifth frequency band; and wherein a frequency of the fifth frequency band is higher than a frequency of the fourth frequency band.

27. The wireless communication device of claim 26, wherein the third radiator comprises a feed section, a first connecting section, a second connecting section, a third connecting section, a fourth connecting section, a fifth connecting section, and a ground section; wherein the feed section is positioned parallel to and spaced apart from the second side portion, and extends along a direction towards the end portion; wherein the first connecting section is perpendicularly connected to one end of the feed section adjacent to the end portion and extends along a direction parallel to the end portion and towards the first side portion; wherein the second connecting section is perpendicularly connected to one end of the first connecting section away from the feed section and extends along a direction parallel to the second side portion and away from the first connecting section; wherein the third connecting section is perpendicularly connected to one end of the second connecting section away from the first connecting section and extends along a direction parallel to the end portion and towards the first side portion; wherein the fourth connecting section is perpendicularly connected to one end of the third connecting section away from the second connecting section and extends along a direction parallel to the first side portion and towards the end portion; wherein the fifth connecting section is perpendicularly connected to one end of the fourth connecting section away from the third connecting section and extends along a direction parallel to the end portion and towards the first side portion; wherein the ground section is positioned between the feed section and the second connecting section, the ground section is positioned parallel to and spaced apart from both the feed section and the second connecting section, one end of the ground section is perpendicularly connected to one side of the first connecting section and extends along a direction parallel to the feed section and away from the end portion, another end of the ground section is grounded.

28. The wireless communication device of claim 20, wherein the antenna structure further comprises a first signal source, the housing further comprises a side frame, the side frame defines a gap, the gap passes through and extends to cut across the side frame, and the side frame is divided into a coupling portion and a first radiating section; wherein the first signal source is positioned in the housing and is electrically connected to the first radiating section, the first signal source divides the first radiating section into a first branch and a second branch; wherein when the first signal source supplies current, the current flows through the first branch and the first branch activates a first operation mode to generate radiation signals in a first radiation frequency band;

wherein the current further flows through the second branch and is coupled to the coupling portion through the gap, and the coupling portion activates a second operation mode to generate radiation signals in a second radiation frequency band.

29. The wireless communication device of claim 28, wherein the side frame further defines a groove, the groove passes through and extends to cut across the side frame; wherein the side frame between the gap and the groove forms the first radiating section.

30. The wireless communication device of claim 29, wherein the side frame comprises an end portion, a first side portion, and a second side portion, the first side portion and the second side portion are respectively connected to two ends of the end portion; wherein the gap and the groove are both defined at the end portion; wherein a portion of the side frame extending from the groove away from the gap and adjacent to the second side portion forms a second radiating section; wherein the antenna structure further comprises a second signal source, the second signal source is electrically connected to the second radiating section for feeding current to the second radiating section, and the second radiating section activates a third operation mode to generate radiation signals in a third radiation frequency band.

* * * * *